US011125281B2

(12) United States Patent
Peglowski et al.

(10) Patent No.: US 11,125,281 B2
(45) Date of Patent: Sep. 21, 2021

(54) ROTATING MULTIMODE CLUTCH MODULE FOR ALL WHEEL DRIVE SYSTEM

(71) Applicant: BorgWarner Inc., Auburn Hills, MI (US)

(72) Inventors: Brett M. Peglowski, Oakland, MI (US); Keith Martin, Marlette, MI (US); Calahan Campton, Royal Oak, MI (US); Christopher E. Blair, Fenton, MI (US); Brett J. Lee, Portland, OR (US)

(73) Assignee: BorgWarner Inc., Auburn Hills, MI (US)

( * ) Notice: Subject to any disclaimer, the term of this patent is extended or adjusted under 35 U.S.C. 154(b) by 11 days.

(21) Appl. No.: 16/080,967

(22) PCT Filed: Mar. 1, 2017

(86) PCT No.: PCT/US2017/020068
§ 371 (c)(1),
(2) Date: Aug. 29, 2018

(87) PCT Pub. No.: WO2017/151693
PCT Pub. Date: Sep. 8, 2017

(65) Prior Publication Data
US 2019/0063513 A1    Feb. 28, 2019

Related U.S. Application Data

(60) Provisional application No. 62/302,032, filed on Mar. 1, 2016.

(51) Int. Cl.
*F16D 41/16* (2006.01)
*F16D 41/14* (2006.01)
(Continued)

(52) U.S. Cl.
CPC .......... *F16D 41/16* (2013.01); *B60K 23/0808* (2013.01); *F16D 41/14* (2013.01); *B60K 17/3462* (2013.01); *B60K 2023/0858* (2013.01)

(58) Field of Classification Search
CPC .... B60K 17/34–348; B60K 23/08–2023/0875; F16H 2057/02052; F16H 2048/02–04
See application file for complete search history.

(56) References Cited

U.S. PATENT DOCUMENTS 3,828,877 A * 8/1974 Fogelberg .......... B60K 17/3465
                                                  180/249
4,417,642 A * 11/1983 Suzuki ............... B60K 17/3467
                                                  180/249
(Continued)

*Primary Examiner* — Ernesto A Suarez
*Assistant Examiner* — James J Taylor, II
(74) *Attorney, Agent, or Firm* — von Briesen & Roper, s.c.

(57) ABSTRACT

In an all-wheel drive (AWD) vehicle, torque carrying connections are provided between the powertrain and all four wheels. A multimode clutch module or clutches are provided to selectively disconnect two of the wheels from the powertrain during operating conditions where disconnection improves the performance and efficiency of the AWD vehicle. The multimode clutch module may be installed at various locations of the AWD vehicle, such as within a front or rear differential, between a half axle and a differential or between a half axle and a corresponding wheel, or within a transfer case or power transfer unit.

15 Claims, 12 Drawing Sheets

(51) Int. Cl.
*B60K 23/08* (2006.01)
*B60K 17/346* (2006.01)

(56) References Cited

U.S. PATENT DOCUMENTS

| | | | |
|---|---|---|---|
| 6,460,671 B1 * | 10/2002 | Karambelas | F16D 41/08 |
| | | | 180/247 |
| 6,557,677 B2 * | 5/2003 | Peura | F16D 41/088 |
| | | | 180/247 |
| 7,425,183 B2 * | 9/2008 | Kelley, Jr. | B60T 1/093 |
| | | | 475/204 |
| 8,172,712 B2 * | 5/2012 | Jarzyna | B60K 17/3467 |
| | | | 475/204 |
| 8,517,882 B2 * | 8/2013 | Wenthen | B60K 17/06 |
| | | | 475/213 |
| 2015/0158383 A1 | 6/2015 | Mastie et al. | |
| 2015/0354640 A1 | 12/2015 | Papania | |

\* cited by examiner

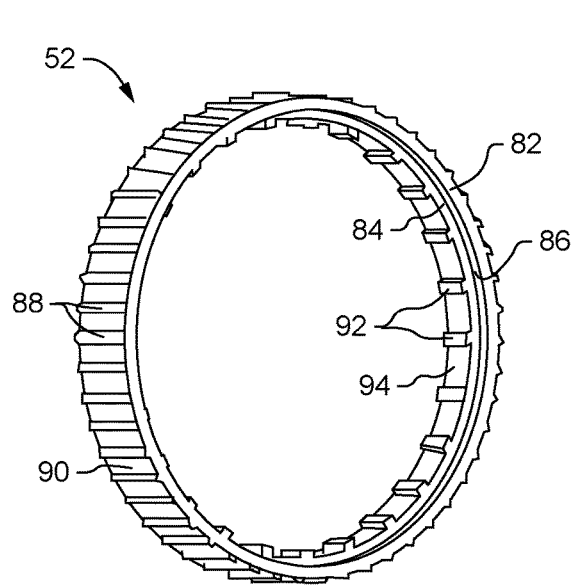
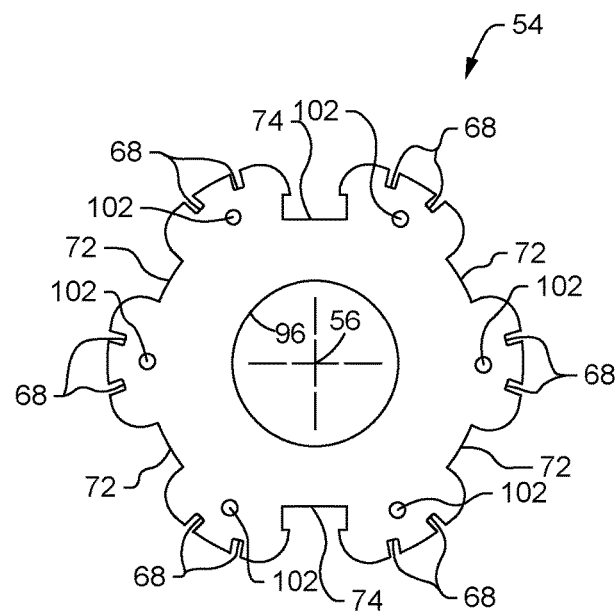
FIG. 5  FIG. 6
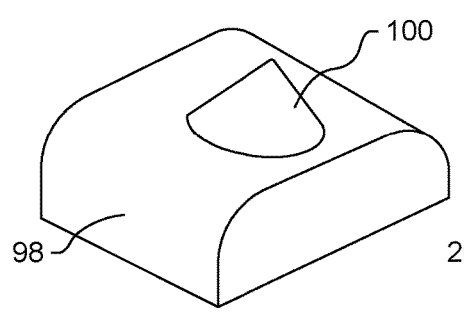
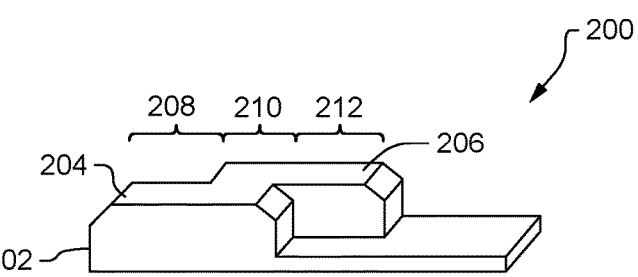
FIG. 7  FIG. 17

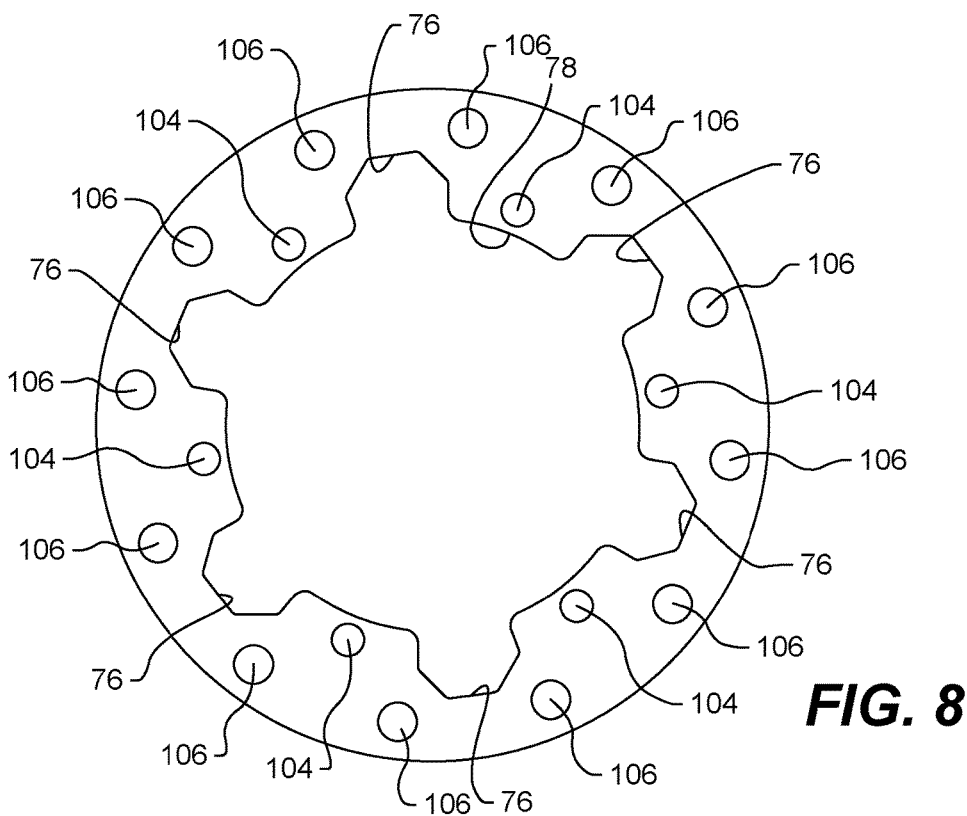
FIG. 8
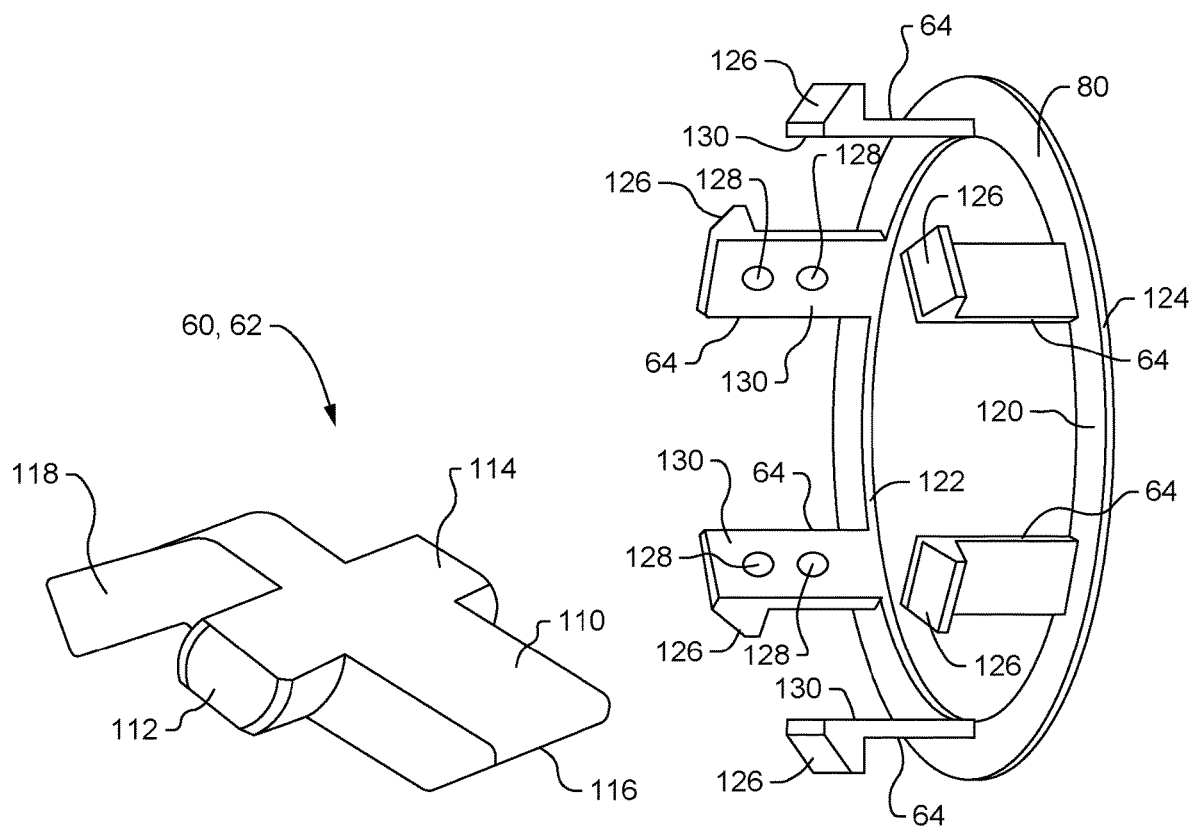
FIG. 9
FIG. 10

ROTATING MULTIMODE CLUTCH MODULE FOR ALL WHEEL DRIVE SYSTEM

FIELD OF THE DISCLOSURE

This disclosure relates generally to all-wheel drive (AWD) vehicles having an engine, a transmission and power transfer to both front and rear sets of drive wheels, and in particular to an AWD vehicle having a multimode clutch module (MMCM) selectively connecting and disconnecting one set of drive wheels from the driveline when the AWD function is not required.

BACKGROUND OF THE DISCLOSURE

AWD vehicles as known in the art provide increased traction and stability by providing power to all four wheels in contrast to two-wheel drive vehicles that provide power to only the front wheels or the rear wheels. To provide power to all four wheels, an AWD vehicle requires torque transferring connections between the powertrain and all four wheels. In one exemplary AWD vehicle, a transmission output shaft may be connected to a transfer case that splits torque from the vehicle's power source, such as an internal combustion engine or an electric motor, between a rear wheel drive shaft and rear differential and a front wheel drive shaft and front differential.

The AWD functionality is useful in handling driving over varying types of terrains and driving conditions. Providing power to all four wheels may ensure that power is transmitted to the surface even when one or more wheels are not in contact with the surface. Moreover, distributing the torque from the powertrain across all four wheels may reduce wheel slippage on slippery surfaces where directing torque to only two wheels can cause those wheels to slip or skid. However, for fuel economy reasons, it may be desirable to disconnect one set of drive wheels and reduce transfer case and differential losses when the AWD function is not required. For example, it is not necessary to drive all four wheels when on the vehicle is cruising on a road or highway in normal dry conditions.

In previous AWD vehicles, one of the sets of drive wheels may be selectively disengaged from the powertrain by the use of a dog clutch or a friction clutch. Friction clutches typically transmit torque between the coupled components for rotation in both directions when engaged, and unlock the components to rotate freely in both directions when disengaged. Dog clutches may selectively lock the components in both directions for rotation together. As is apparent, these clutches provide two modes of connections (modulated two-way torque distribution/two-way unlock or two-way lock/two-way unlock) between a set of wheels and the powertrain. However, conditions may exist where it may be desirable to offer either two-way lock/one-way unlock or all three modes in connecting the powertrain to the set of driven wheels. At present, such functionality may only be achievable with multiple clutches. In view of this, a need exists for a clutching arrangement in AWD vehicles with the flexibility to provide clutching modes not previously achieved with the common AWD vehicle clutch devices as described above.

SUMMARY OF THE DISCLOSURE

In one aspect of the present disclosure, an all-wheel drive (AWD) vehicle is disclosed. The AWD vehicle includes a pair of front wheels, a pair of rear wheels, a power source, a transmission operatively connected to the power source and receiving power output by the power source, the transmission having a transmission output shaft, a front wheel driveline operatively connected between the power source output shaft and the front wheels to transfer power from the power source to rotate the front wheels, a rear wheel drive shaft operatively connected between the transmission output shaft and the rear wheels to transfer power from the power source to rotate the rear wheels, and a multimode clutch module operatively connected between the transmission output shaft and the rear wheel drive shaft to allow the rear wheel drive shaft to selectively transmit power from the power source to the rear wheels. The multimode clutch module has a first mode wherein the multimode clutch module transmits torque from the power source to the rear wheels when the transmission output shaft rotates, and a second mode wherein the multimode clutch module does not transmit torque from the power source to the rear wheels when the transmission output shaft rotates.

In another aspect of the present disclosure, a power transfer unit for an AWD vehicle is disclosed. The AWD vehicle may include a power source, a transmission operatively connected to the power source and having a transmission output shaft, a front wheel driveline operatively connected between the transmission output shaft and a pair of front wheels to transfer power from the power source to the front wheels, and a rear wheel drive shaft operatively connected to a pair of rear wheels. The power transfer unit includes a power transfer unit input shaft operatively connected to the transmission output shaft, a power transfer unit output shaft operatively connected to the rear wheel drive shaft, a plurality of gears operatively connecting the power transfer unit input shaft to the power transfer unit output shaft so that rotation of the power transfer unit input shaft causes rotation of the power transfer unit output shaft with a reduction in rotational speed from a rotational speed of the transmission output shaft, and a multimode clutch module allowing the power transfer unit to selectively transmit power from the power source to the rear wheels. The multimode clutch module has a first mode wherein the multimode clutch module transmits torque from the power transfer unit input shaft to the power transfer unit output shaft through the plurality of gears and a second mode wherein the multimode clutch module does not transmit torque from the power transfer unit input shaft to the power transfer unit output shaft through the plurality of gears.

Additional aspects are defined by the claims of this patent.

BRIEF DESCRIPTION OF THE DRAWINGS

FIG. 5 is an isometric view of an outer race or notch ring in accordance with the present disclosure of the MMCM of FIG. 3;

FIG. 6 is a front view of an inner race in accordance with the present disclosure of the MMCM of FIG. 3;

FIG. 7 is an isometric view of a detent block in accordance with the present disclosure of the MMCM of FIG. 3;

FIG. 8 is a front view of a side plate in accordance with the present disclosure of the MMCM of FIG. 3;

FIG. 9 is an isometric view of a pawl in accordance with the present disclosure of the MMCM of FIG. 3;

FIG. 10 is an isometric view of a cam ring and associated cams in accordance with the present disclosure of the MMCM of FIG. 3;

FIG. 17 is an isometric view of an alternative embodiment of a cam in accordance with the present disclosure of the MMCMs of FIGS. 3 and 15;

DETAILED DESCRIPTION

Figure 1:
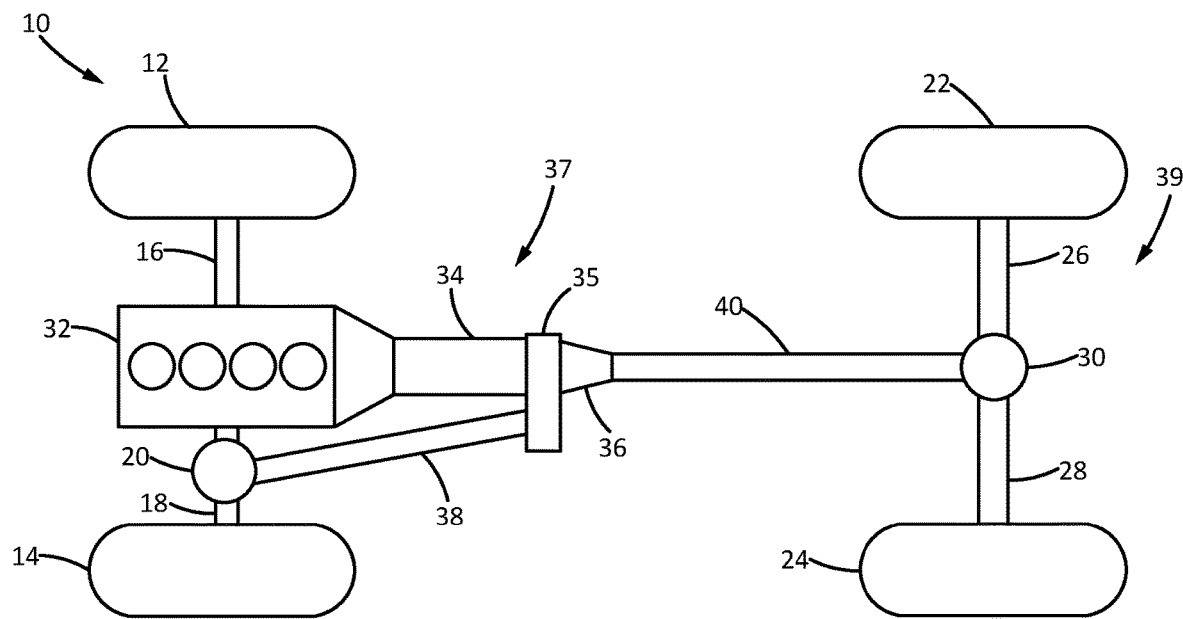
FIG. 1 is a schematic illustration of an embodiment of an AWD vehicle in which one or more MMCM in accordance with the present disclosure may be implemented to disengage a set of front wheels from the powertrain.

FIG. 1 is a schematic illustration of an exemplary AWD vehicle 10 known in the art. The AWD vehicle 10 includes a first or front set of driven wheels 12, 14 connected via front half shafts 16, 18 to a front differential 20, and a second or rear set of driven wheels 22, 24 mounted via rear half shafts 26, 28 to a rear differential 30. A power source 32, such as an internal combustion engine or an electric motor, may have an output shaft (not shown) operatively connected to a transmission or gearbox 34. The power source 32 is located at the front of the AWD vehicle 10, but the concepts discussed herein may be implemented in a similar manner in AWD vehicles having rear-mounted power sources. Internal gearing and a transmission output shaft 35 of the transmission 34 connect the power source 32 to a transfer case 36. The transfer case 36 may split the torque from the power source 32 and transmit the torque through the transmission 34 to both the front wheels 12, 14 and the rear wheels 22, 24. A front wheel drive shaft 38 may connect the transfer case 36 to the front differential 20, and a rear wheel drive shaft 40 may connect the transfer case 36 to the rear differential 30. With this arrangement, the transfer case 36, the front wheel drive shaft 38, the front differential 20 and the front half shafts 16, 18 may form a first or front driveline 37 to the front wheels 12, 14, and the transfer case 36, the rear wheel drive shaft 40, the rear differential 30 and the rear half shafts 26, 28 may form a second or rear driveline 39 to the rear wheels 22, 24.

Figure 2:
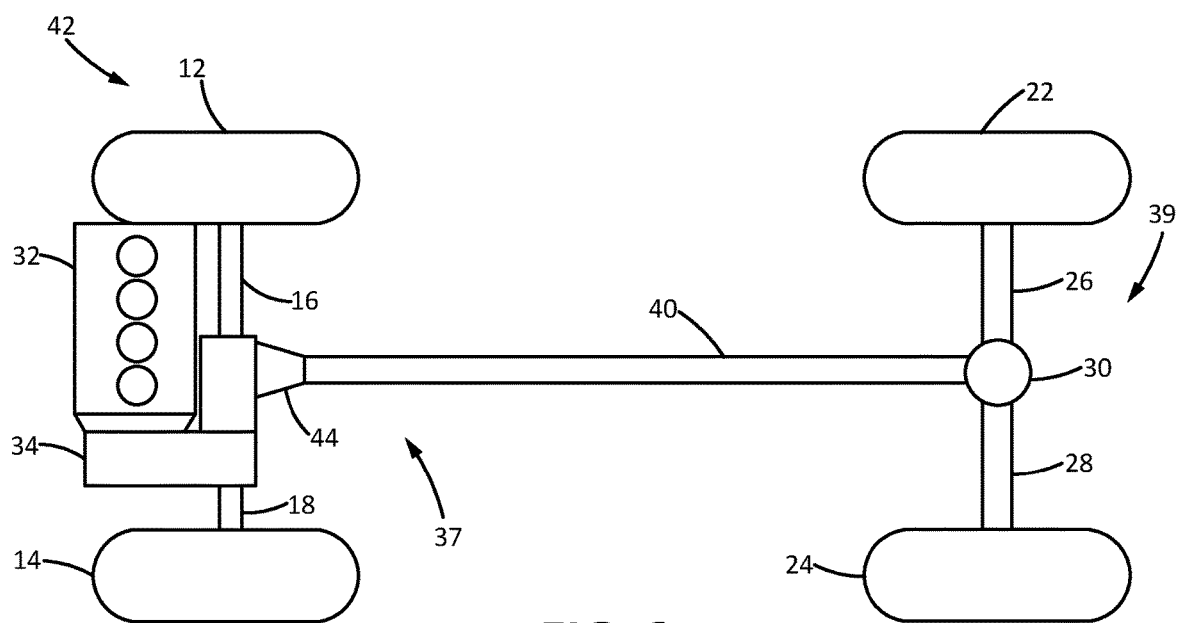
FIG. 2 is a schematic illustration of an embodiment of an AWD vehicle in which one or more MMCM in accordance with the present disclosure may be implemented to disengage a set of rear wheels from the powertrain.

In the absence of any additional clutching arrangements, rotation of the transmission output shaft 35 by torque transmitted through the power source output shaft will cause corresponding rotation of both the front wheels 12, 14 and the rear wheels 22, 24. As will be discussed further in the embodiments below, the AWD vehicle 10 may perform as a rear-wheel drive vehicle when a multimode clutch is implemented and actuated to disengage the front wheels 12, 14 from the powertrain. FIG. 2 illustrates an example of an AWD vehicle 42 that may perform as a front-wheel drive vehicle when an implemented multimode clutch is actuated to disengage the rear wheels 22, 24 from the powertrain. In FIG. 2, similar components of the AWD vehicle 42 are identified using the same reference numerals as used for the elements of the AWD vehicle 10 in FIG. 1. In the AWD vehicle 42, the power source 32 may be transversely mounted at the front of the AWD vehicle 42, and the transmission 34 may provide torque to the front half shafts 16, 18 via a front wheel drive shaft 38 and a front differential 20 that are not visible in the schematic illustration. The transfer case 36 of the AWD vehicle 10 may be replaced by a power transfer unit (PTU) 44 operatively connected between the front differential 20 and the rear wheel drive shaft 40 to transfer power to the rear wheel drive shaft 40 and the rear wheels 22, 24. As illustrated and discussed later in the present disclosure, multimode clutches may be implemented in the AWD vehicle 42 in a manner to selectively disengage the rear wheels 22, 24 from the powertrain.

Figure 3:
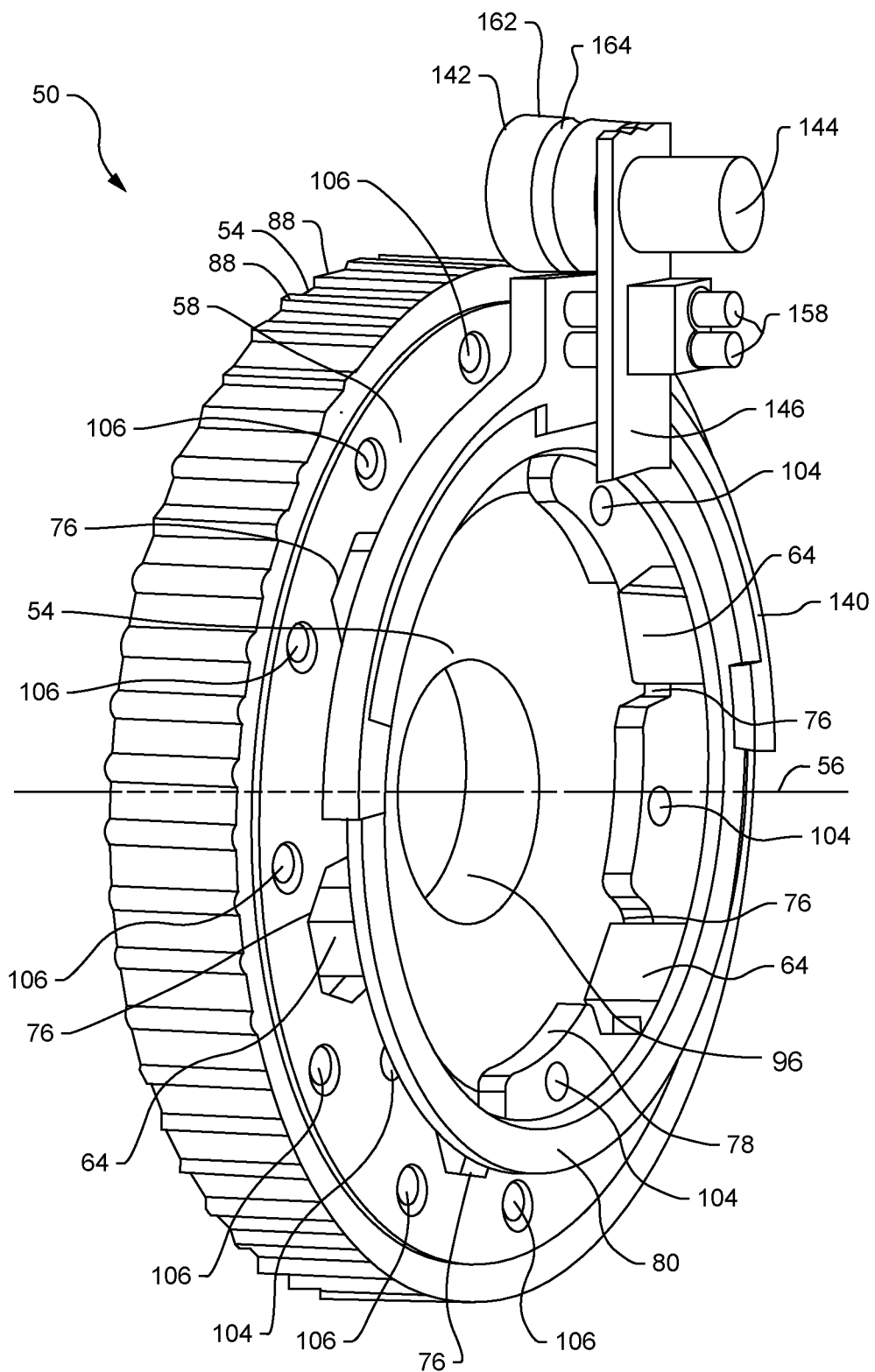
FIG. 3 is an isometric view of a rotary MMCM having a stationary actuator in accordance with the present disclosure.
Figure 4:
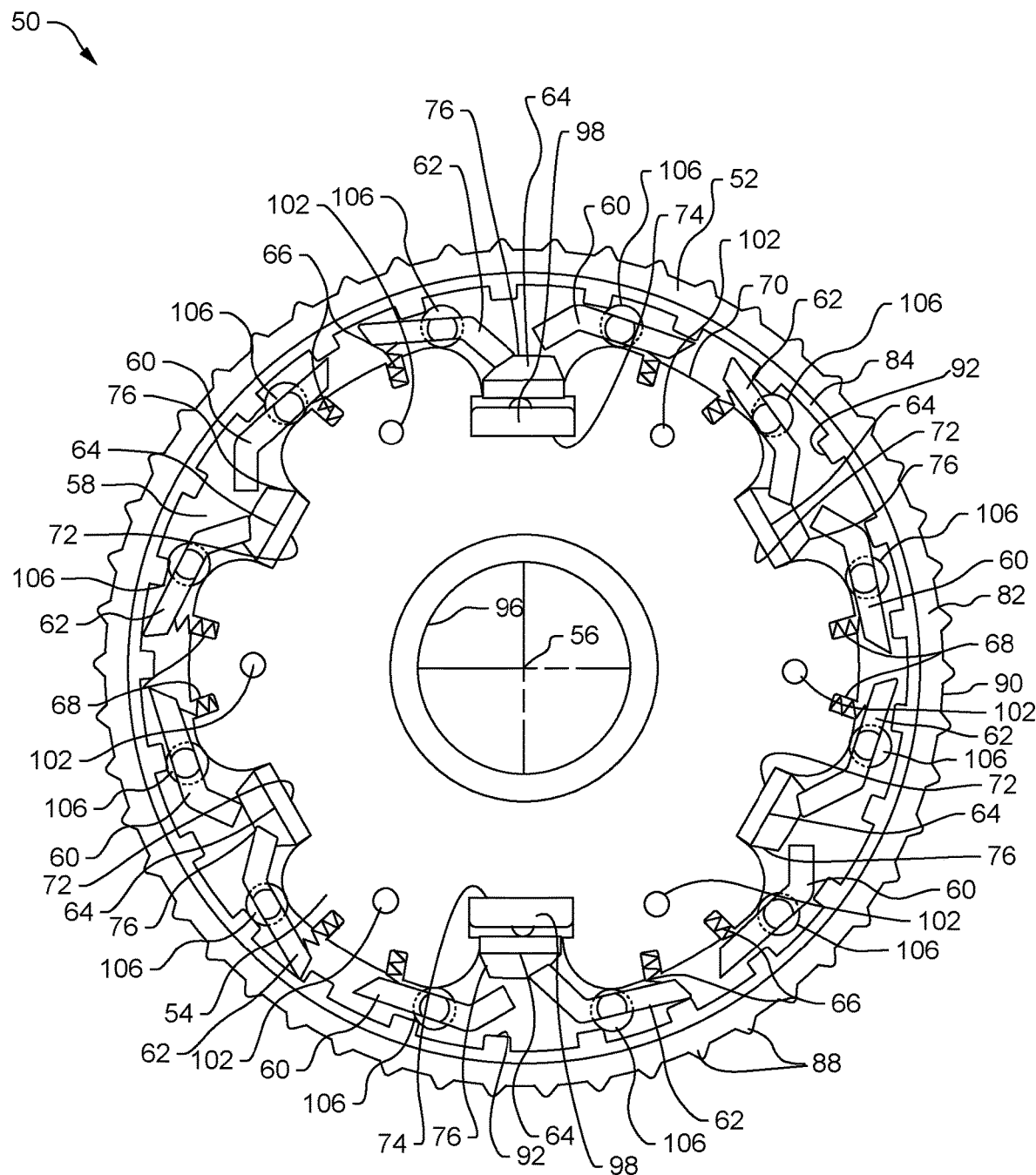
FIG. 4 is a front view of MMCM of FIG. 3 with a near side plate removed to illustrate internal components of the MMCM.

As discussed above, it may be desirable to disconnect either the front wheels 12, 14 or the rear wheels 22, 24 from the powertrain when the AWD functionality is not required. In accordance with the present disclosure, a multimode clutch module may be implemented at various locations of the AWD vehicle 10 to provide multiple modes for connecting and disconnecting the front wheels 12, 14 or the rear wheels 22, 24 to and from the powertrain. FIGS. 3 and 4 illustrate an embodiment of a MMCM 50 that can be used to connect a first rotating component (not shown) to a second rotating component (not shown) in a machine, such as a transmission of a vehicle. The MMCM 50 may include an outer race or notch ring 52 to which the first rotating component is connected, and an inner race 54 to which the second rotating component is connected. The notch ring 52 and the inner race 54 are concentrically aligned along a clutch rotational axis 56 that is also common to the rotating components when the MMCM 50 is installed. The inner race 54 may be disposed between and connected for rotation with a pair of side plates 58 (one shown in FIGS. 3 and 4) that maintain the inner race 54 in an approximately fixed axial location relative to the notch ring 52 as the second rotating component drives the inner race 54 and the side plates 58.

The locking and unlocking modes of the MMCM 50 may be controlled by a plurality of pawls 60, 62 (FIG. 4) and corresponding cams 64. In the illustrated embodiment, the pawls 60, 62 are pivotally mounted between the side plates 58 for rotation about pawl axes (not identified) that are parallel to the clutch rotational axis 56 of the MMCM 50. The first pawls 60 may selectively rotate into engagement with the notch ring 52 to prevent the inner race 54 and the second rotating component from rotating in a first direction (clockwise as shown in FIG. 4) relative to the notch ring 52 and the first rotating component. Similarly, the second pawls 62 may selectively rotate into engagement with the notch ring 52 to prevent inner race 54 and the second rotating component from rotating in a second direction (counter-clockwise as shown in FIG. 4) relative to the notch ring 52 and the first rotating component. Each of the pawls 60, 62 may be biased toward engagement with the notch ring 52 by a corresponding pawl spring 66 compressed between the pawl 60, 62 and a spring notch 68 along an outer edge 70 of the inner race 54.

Each first pawl 60 may be paired with a corresponding one of the second pawls 62 so that the paired pawls 60, 62 may both be acted upon by one of the cams 64 to rotate between their engaged/locked positions and their disengaged/unlocked positions. The cams 64 may be disposed within cam notches 72, 74 in the inner race outer edge 70 and corresponding cam recesses 76 in side plate inner edges 78 proximate the corresponding pawls 60, 62. The cams 64 may be connected for coordinated movement by a cam ring 80 disposed on one side of the MMCM 50 and outside one of the side plates 58. The cam notches 72, 74 and/or the cam recesses 76 may engage the cams 64 so that the cams 64 and the cam ring 80 rotate with the inner race 54, the side plates 58 and the pawls 60, 62 as a single inner race assembly (not numbered) relative to the notch ring 52. At the same time, the cams 64 are slidable within the cam notches 72, 74 and the cam recesses 76 parallel to the clutch rotational axis 56 of the MMCM 50. Those skilled in the art will understand that the pivoting pawls 60, 62 of the illustrated embodiment are exemplary. Pawls coupled to the inner race 54 and movable in translation, rotation or other complex motions relative to the inner race 54 and into and out of engagement with the notch ring 52 are contemplated by the inventor as having use in MMCMs 50 in accordance with the present disclosure.

The outer race or notch ring 52 is shown in greater detail in FIG. 5. The notch ring 52 may include an annular outer ring 82 and an annular inner ring 84 extending radially inwardly from an inward surface 86 of the outer ring 82. The inner ring 84 may have a narrower width that the outer ring 82 so that the inner ring 84 may be captured between the side plates 58 when the inner race assembly is assembled to maintain the notch ring 52 and the inner race 54 in an approximately constant position along the clutch rotational axis 56 of the MMCM 50. The notch ring 52 may further include a plurality of outer teeth 88 extending radially outwardly from and circumferentially spaced about a radially outward surface 90 of the outer ring 82. The outer teeth 88 may be arranged to mesh with and engage corresponding teeth or other structures of the first rotating component so that the notch ring 52 and the component rotate together. A plurality of inner teeth 92 may extend radially inwardly from and be circumferentially spaced about an inward surface 94 of the inner ring 84. The inner teeth 92 will be engaged by the pawls 60, 62 to lock the notch ring 52 and the inner race 54 against relative rotation when the pawls 60, 62 are in their locked positions as will be discussed further below.

The inner race 54 as described above is illustrated in greater detail in FIG. 6. The inner race 54 is a generally circular plate having an inner race central opening 96 aligned along the clutch rotational axis 56 and configured for connection of the second rotating component. The cam notches 72 are shaped to slidably receive the corresponding cams 64 therein. The cam notches 74 having different configuration that allows the cam notches 74 to also receive a detent block 98 therein. As shown in FIG. 7, the detent block 98 may include a detent member 100 extending outwardly therefrom that will engage recesses in a corresponding one of the cams 64 to ensure that the cams 64 are correctly positioned in each of the lock modes of the MMCM 50 as will be illustrated and described further below. The cam notches 74 and the detent blocks 98 are sized so that the detent blocks 98 may be press fit into the cam notches 74 and retained in place as the cams 64 move axially within the cam notches 74. Returning to FIG. 6, the inner race 54 may further include a plurality of locking rod openings 102 circumferentially spaced about the inner race 54 that may receive corresponding locking rods (not shown) that will constrain the inner race 54 and the side plates 58 to rotate together about the clutch rotational axis 56.

As shown in FIG. 8, each side plate 58 is a generally annular plate having a side plate inner edge 78 with the cam recesses 76 defined there in. The cam recesses 76 are circumferentially spaced about the side plate inner edge 78 to align with corresponding ones of the cam notches 72, 74 when the inner race assembly is assembled. The side plates 58 have a plurality of locking rod openings 104 circumferentially spaced about the side plates 58 to correspond to the locking rod openings 102 of the inner race 54. During assembly, locking rods or other alignment mechanisms may be inserted through the locking rod openings 102, 104 to align the cam notches 72, 74 with the cam recesses 76, and to constrain the inner race 54 and the side plates 58 to rotate together about the clutch rotational axis 56. Each of the side plates 58 further includes a plurality of pawl arm openings 106 circumferentially spaced about the side plates 58 proximate a side plate outer edge 108. The pawl arm openings 106 may be sized to receive corresponding pivot arms of the pawls 60, 62 so that the pawls 60, 62 are suspended between the side plates 58 and are pivotable relative to the side plates 58 and the inner race 54 between their locked and unlocked positions.

The inner race assembly will capture the notch ring 52 in a manner that allows relative rotation of the notch ring 52 and the inner race 54 while maintaining their relative positions along the clutch rotational axis 56. The side plates 58 have an outer diameter that is slightly less than an inner diameter of the outer ring 82 so that the side plates 58 fit within the outer ring 82 without rubbing against the inward surface 86. The outer diameter of the side plates 58 is greater than an inner diameter of the inner ring inward surface 94 so that the inner ring 84 and the inner teeth 92 are captured between the side plates 58. Additionally, the inner race 54 may have a thickness that is greater a thickness of the inner ring 84 and the inner teeth 92 so that the side plates 58 are spaced apart sufficiently so that the inner ring 84 is not pinched between side plates 58 and friction between the notch ring 52 and the inner race 54 and resistance to their relative rotation is minimized. The illustrated embodiment is exemplary of relative sizes of the notch ring 52, the inner race 54 and the side plates 58. Alternative configurations of the MMCM 50 are contemplated where the notch ring 52 and the inner race 54 are concentric and axially aligned with the pawls 60, 62 rotating with the inner race 54 and being movable into and out of engagement with the notch ring 52.

FIG. 9 illustrates an embodiment of the pawls 60, 62 of the inner race assembly. Each of the pawls 60, 62 may have a similar configuration, and be oriented as shown in FIG. 4 during assembly to ensure that the pawls 60 lock the inner race 54 against rotation relative to the notch ring 52 in one direction, and the pawls 60 to lock the inner race 54 against rotation relative to the notch ring 52 in the opposite direction. The pawls 60, 62 may have a pawl body 110 having a pair of pawl pivot arms 112, 114 extending outwardly from the pawl body 110 in opposite directions. The pawl pivot arms 112, 114 may be generally cylindrical and sized to be received within the pawl arm openings 106 of the side plates 58 so that the pawls 60, 62 can pivot about an axis that is approximately parallel to the clutch rotational axis 56 of the MMCM 50. One end of the pawl body 110 may terminate in a tooth engagement tip 116 that will be disposed proximate the inward surface 94 of the notch ring 52 and engage one of the inner teeth 92 when the pawl 60, 62 is rotated to its locked position. Opposite the tooth engagement tip 116, a camming end 118 may extend outwardly from the pawl body 110 and be configured to be engaged by the corresponding cam 64 to rotate the pawls 60, 62 between the locked and unlocked positions.

The cams 64 and the cam ring 80 are illustrated in greater detail in FIG. 10. As will be discussed further below, the cams 64 extend from a surface 120 of the cam ring 80 proximate a cam ring inner edge 122 so that an area proximate a cam ring outer edge 124 is free of obstruction. Each of the cams 64 includes a camming surface 126 that will engage the camming ends 118 of the corresponding pawls 60, 62 to control the rotational position of the pawls 60, 62 is the cams 64 slide within the cam notches 72, 74. The cams 64 may further include detent recesses 128 in inward surfaces 130 that will face the detent blocks 98 when the inner race assembly is assembled and receive the detent members 100 when the cams 64 are in discrete positions placing the pawls 60, 62 in corresponding ones of the locking modes of the MMCM 50.

Returning to FIG. 3, a mode shift execution assembly for the MMCM 50 may include a shift ring 140 at least partially encircling the cam ring 80, a shift drum 142 operatively coupled to the shift ring 140 to cause the shift ring 140 to move parallel to the clutch rotational axis 56 when the shift drum 142 rotates, and an actuator 144 operatively coupled to the shift drum 142 to apply torque to the shift drum 142 and cause the shift drum 142 to rotate in response to actuator control signals indicating a direction and speed of rotation. During rotation of the rotating components connected by the MMCM 50, the clutch rotational axis 56, and correspondingly the notch ring 52 and the inner race 54, may remain in a substantially fixed position relative to the structure of the machine in which the MMCM 50 is implemented, with the notch ring 52 and the inner race 54 rotating about the clutch rotational axis 56 with the corresponding rotating components. The mode shift execution assembly may also be constrained to a substantially fixed position by connecting the components to a mounting plate 146 that is connected to a frame, housing or other stationary component of the machine.

Figure 11:
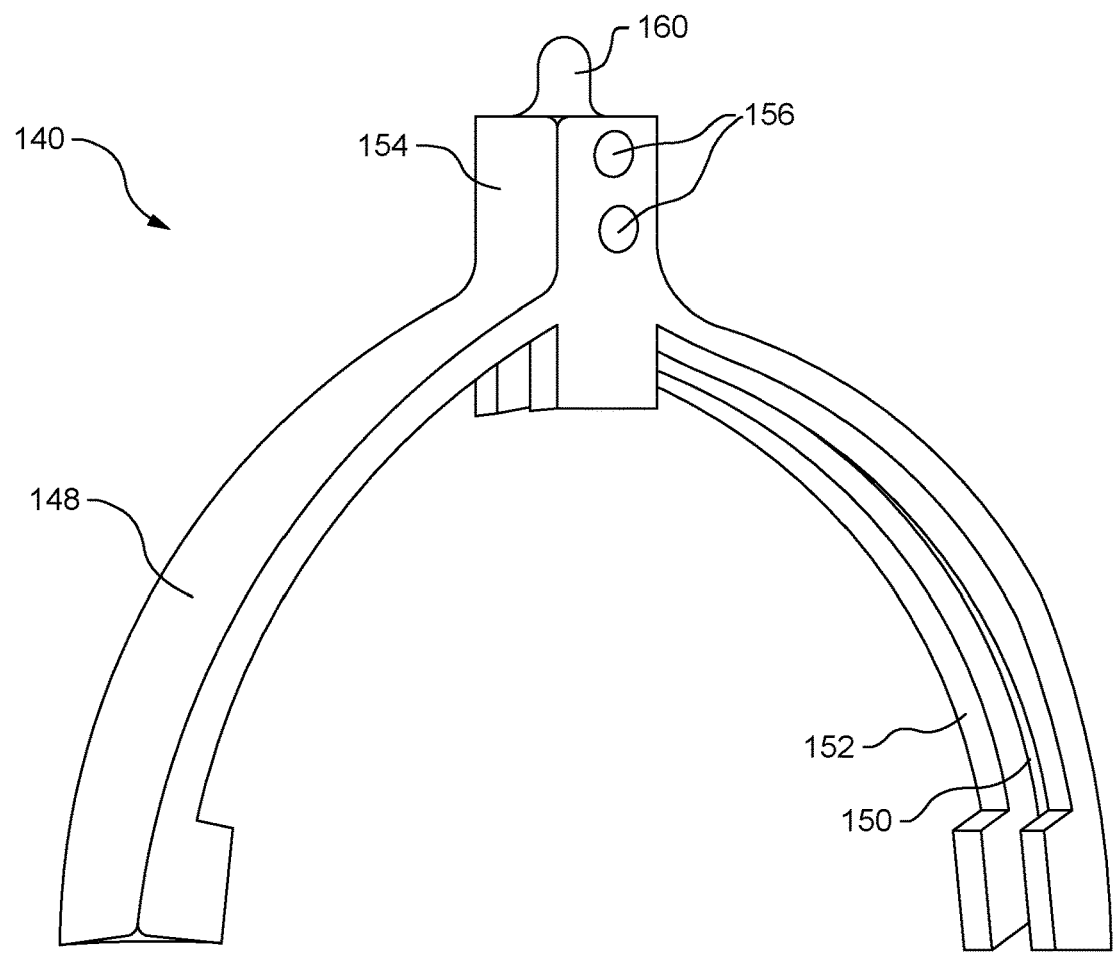
FIG. 11 is an isometric view of a shift ring in accordance with the present disclosure of the MMCM of FIG. 3.

The shift ring 140 is shown in greater detail in FIG. 11. The shift ring 140 may include a circular or semi-circular cam ring engaging portion 148 that wraps partially around the cam ring 80 when the MMCM 50 is assembled. The cam ring engaging portion 148 may have an annular groove 150 defined in a shift ring inner surface 152. An inner diameter of the inner surface 152 may be less than an outer diameter of the cam ring 80, and the annular groove 150 may be deep enough into the cam ring engaging portion 148 so that the cam ring 80 is disposed within the annular groove 150 with clearance for the cam ring outer edge 124. At the same time, the inner diameter of the inner surface 152 may be large enough to provide clearance between the inner surface 152 and the cams 64 extending from the cam ring 80. A width of the annular groove 150 may be greater than a thickness of the cam ring 80 to provide an air gap between the cam ring 80 and the annular groove 150 when the MMCM 50 is in position for one of the locking modes as will be described more fully below.

The shift ring 140 may further include a mounting portion 154 extending from the cam ring engaging portion 148 and configured to operatively connect the shift ring 140 to the mounting plate 146. In the illustrated embodiment, the mounting portion 154 includes two guide rod openings 156 for slidably receiving guide rods 158 (FIG. 3) extending from the mounting plate 146 that will constrain the shift ring 140 to linear movement parallel to the clutch rotational axis 56 of the MMCM 50. The shift ring 140 further includes a shift ring cam follower 160 extending from the mounting portion 154 that will be operatively coupled to the shift drum 142 to move the shift ring 140 and the cam ring 80 between the discrete locking positions.

Figure 12:
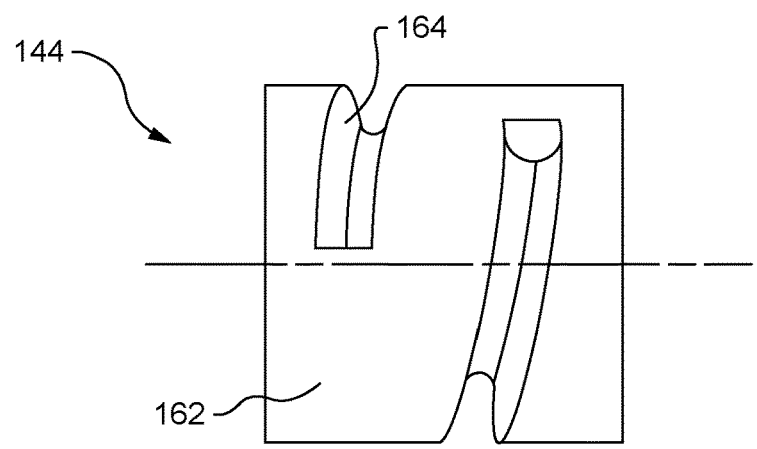
FIG. 12 is a side view of a shift drum in accordance with the present disclosure of the MMCM of FIG. 3.

An embodiment of the shift drum 142 is shown in FIG. 12. The shift drum 142 has a cylindrical shape and is rotationally mounted on the mounting plate 146 for rotation about an axis that is parallel to the clutch rotational axis 56. An outer surface 162 of the shift drum 142 may define a shift drum camming groove 164 extending circumferentially around the shift drum 142. The shift drum camming groove 164 may have a helical shape so that the camming groove 164 progresses axially along the outer surface 162 as the camming groove 164 extends around the shift drum 142. The camming groove 164 may have the shift ring cam follower 160 disposed therein so that the shift ring 140 and the cam ring 80 will move linearly parallel to the clutch rotational axis 56 when the actuator 144 rotates the shift drum 142 and the camming groove 164 forces the shift ring 140 to slide along the guide rods 158. The camming groove 164 may have a constant pitch so that its axial position and the axial position of the shift ring 140 and the cam ring 80 change at a fixed rate as the shift drum 142 is rotated by the actuator 144.

The actuator 144 may be any appropriate actuator that produces rotary motion when a signal is transmitted thereto. For example, the actuator 144 may be a hydraulic actuator, a solenoid actuator, a stepper motor or any other device that can rotate between discrete angular positions and cause the shift drum 142 to rotate. The actuator 144 may be operatively connected to a control device that can output control signals, variable current, variable fluid flow or other inputs that can cause the actuator 144 to rotate between predetermined discrete angular positions that will cause the cams 64 to move to the discrete positions of the locking modes of the MMCM 50. Of course, the actuator 144 could be a linear actuator or other types of actuator having a non-rotation output movement so long as the actuator is actuatable between discrete positions, fixed relative to the frame or housing of the machine, and operatively connected to the shift drum 142 by lever arms, a linkage assembly or other appropriate connection mechanism in a manner that converts the output movement of the actuator 144 into torque on and rotation of the shift drum 142 between the discrete angular positions.

Figure 13:
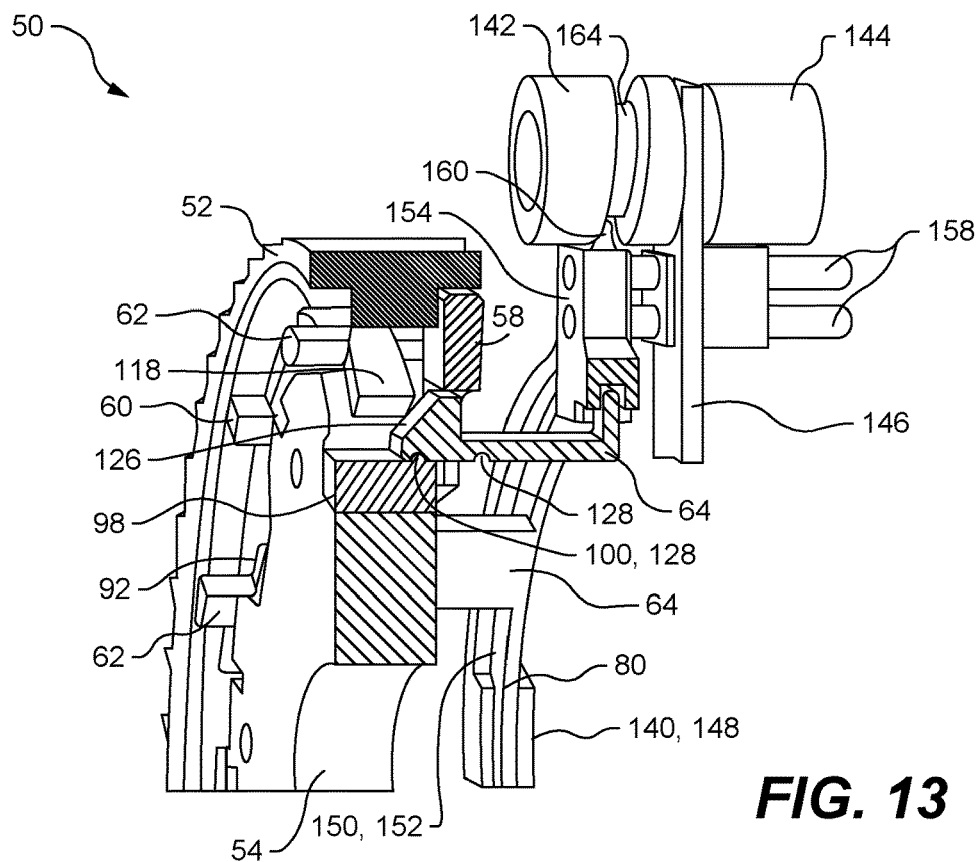
FIG. 13 is a partial cross-sectional isometric view the MMCM of FIG. 3 with the near side plate removed and the MMCM in a two-way locked mode.

The operation of the MMCM 50 will be illustrated and described with reference to FIGS. 13 and 14. In FIG. 13, the MMCM is illustrated in a two-way locked mode wherein the notch ring 52 and the inner race 54 are locked for rotation together in the clockwise and the counterclockwise directions. The shift ring 140 and the cam ring 80 are positioned axially away from the notch ring 52 and the inner race 54 so that the camming surfaces 126 of the cams 64 are not engaging the camming ends 118 of the pawls 60, 62. Without the cams 64 displacing the camming ends 118, the pawls 60, 62 are biased toward their locked positions with the tooth engagement tips 116 positioned to engage the inner teeth 92 of the notch ring 52. The detent members 100 of the detent blocks 98 are disposed within the detent recesses 128 of the cams 64 corresponding to the two-way locked mode of the MMCM 50 to ensure that the cams 64 are correctly positioned. At the same time, the shift drum 142 has been rotated to a first prescribed angular position for the two-way locked mode by the actuator 144 so that the portion of the inner surface 152 defining the annular groove 150 in the cam ring engaging portion 148 of the shift ring 140 is spaced from the cam ring 80 so that the cam ring 80 is free to rotate with the inner race 54 without drag from friction between the cam ring 80 and the inner surface 152.

Figure 14:
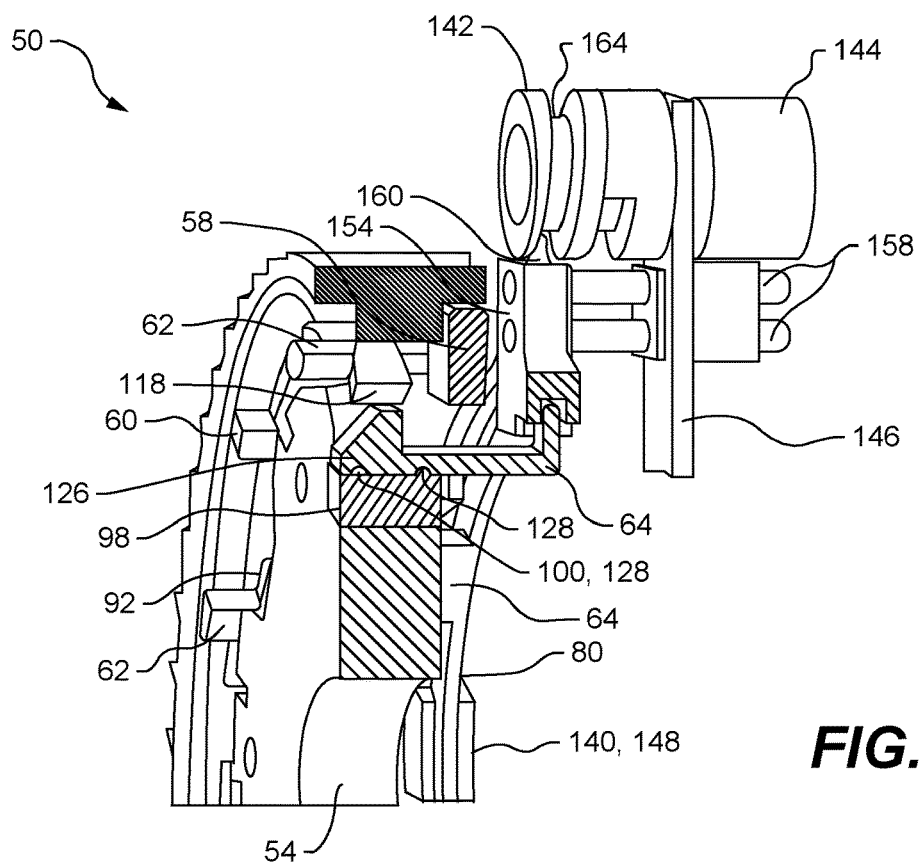
FIG. 14 is the partial cross-sectional isometric view the MMCM of FIG. 13 in a two-way unlocked mode.

When the MMCM 50 is to be transitioned to a two-way unlocked mode shown in FIG. 14, appropriate signals are transmitted to the actuator 144 to actuate and rotate the shift drum 142 to a second prescribed angular position for the two-way unlocked mode. As the actuator 144 rotates the shift drum 142 toward the second prescribed angular position, the point of engagement between the camming groove 164 and the shift ring cam follower 160 moves axially toward the notch ring 52 and the inner race 54. The engagement between the camming groove 164 and the shift ring cam follower 160 causes the shift ring 140 to slide axially along the guide rods 158. The annular groove 150 of the shift ring 140 will first move into engagement with the cam ring 80, and then push the cam ring 80 and the cams 64 so that the detent recesses 128 for the two-way lock mode move past the detent member 100 and the camming surfaces 126 of the cams 64 move into engagement with the camming ends 118 of the pawls 60, 62. The camming surfaces 126 cause the pawls 60, 62 to rotate against the biasing forces of the pawl springs 66 and out of engagement with the inner teeth 92 of the notch ring 52. As the shift ring 140 and the cam ring 80 continue to move axially, the detent recesses 128 corresponding to the two-way unlocked mode of the MMCM 50 will approach and receive the corresponding detent members 100 and the cams 64 will snap in place in their two-way unlocked position with the detent members 100 disposed in the detent recesses 128 for proper alignment. The actuator 144 will eventually stop the shift drum 142 at the second predetermined angular position shown in FIG. 14 with the inner surface 152 defining the annular groove 150 spaced from the cam ring 80 for rotation of the cam ring 80 without drag from friction. When the MMCM 50 returns to the two-way locked mode of FIG. 13, the actuator 144 rotates the shift drum 142 in the opposite direction toward the first prescribed angular position to cause the cams 64 to disengage from the pawls 60, 62.

Figure 16:
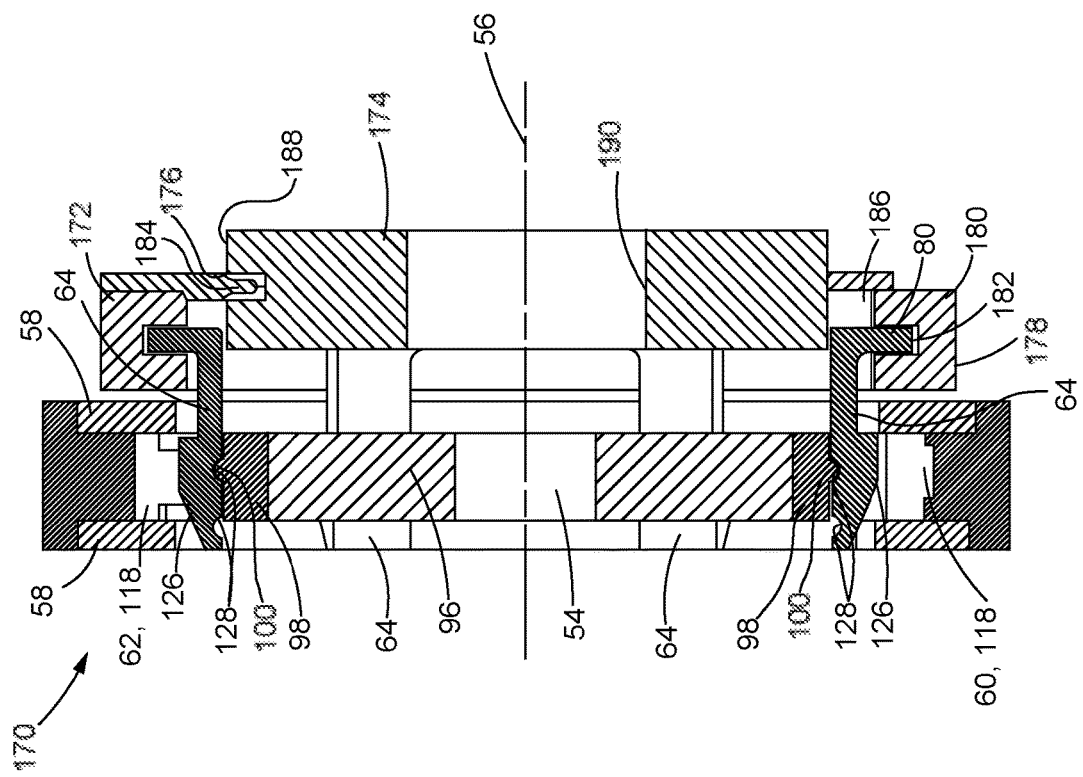
FIG. 16 is a side cross-sectional view of the MMCM of FIG. 15.
Figure 15:
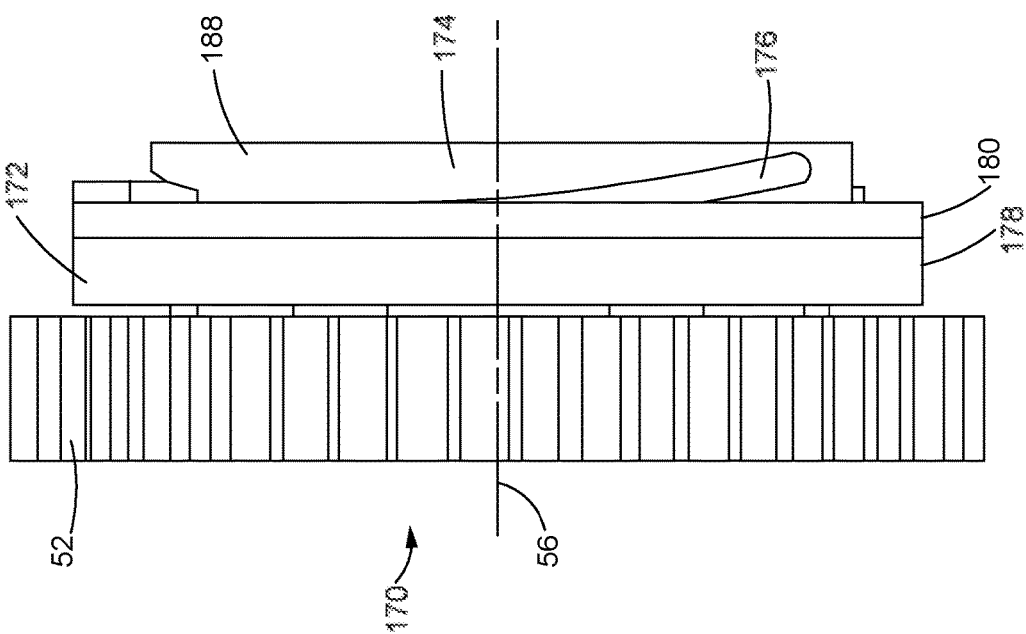
FIG. 15 is a side view of any alternative embodiment of a rotating MMCM having a stationary actuator in accordance with the present disclosure.

FIGS. 15 and 16 illustrate an alternative embodiment of an MMCM 170 having a modified mode shift execution assembly. Referring to FIG. 15, the notch ring 52, the inner race 54 and the other components of the inner race assembly may be configured in a similar manner as described above. The mode shift execution assembly of the MMCM 170 may include a shift ring 172 encircling the cam ring 80. The shift ring 172 may be operatively connected to the frame or housing of the machine so that the shift ring 172 is concentric with the notch ring 52 and the inner race 54 on the clutch rotational axis 56 and can translate parallel to the clutch rotational axis 56, while also being constrained to prevent rotation about the clutch rotational axis 56. A shift drum 174 may also be concentric with the notch ring 52, the inner race 54 and the shift ring 172 about the clutch rotational axis 56 and may include a helical camming groove 176 similar to the camming groove 164 of the shift drum 142 as described above.

Referring to the cross-sectional view of FIG. 16, the shift ring 172 may be formed from multiple components 178, 180 that are assembled around the cam ring 80. In the illustrated embodiment, the components 178, 180 are annular discs that may be disposed on either side of the cam ring 80 and connected to form the shift ring 172 and to define an annular groove 182 surrounding the cam ring 80. The annular groove 182 may have a similar configuration as the annular groove 150 of the shift ring 140, with an inner diameter that is greater than the outer diameter of the cam ring 80 and a width of the annular groove 182 may be greater than the thickness of the cam ring 80 to reduce friction and drag when the cam ring 80 rotates relative to the shift ring 172. The shift ring 172 further includes a cam follower 184 extending inwardly into a shift drum opening 186 in which the shift drum 174 is disposed, with the cam follower 184 being received within the camming groove 176 of the shift drum 174. Other arrangements are contemplated for installing the shift ring 172 on the cam ring 80. For example, the annular shift ring 172 may be divided into two semi-circular half rings that may each be similar to the cam ring engaging portion 148 of the shift ring 140. The half rings may be placed around the cam ring 80 with their ends connected to form the shift ring 172. In a further alternative, the shift ring 172 may be formed around the cam ring 80 as a single unitary component by a process such as three dimensional printing. Additional alternatives will be apparent to those skilled in the art and are contemplated by the inventor.

The shift drum 174 may have a generally similar configuration as the shift drum 142 and have the helical camming groove 176 extending around an outer surface 188 of the shift drum 174. The shift drum 174 have a shift drum opening 190 centered on the clutch rotational axis 56 and configured so that the second rotating component of the machine connected to the inner race 54 may pass there through. The shift drum 174 may be operatively connected to the frame or housing of the machine so that the shift drum 174 is centered on the clutch rotational axis 56 and constrained to a fixed axial position relative to the notch ring 52 and the inner race 54, while also being free to rotate about the clutch rotational axis 56. The shift drum 174 may have an actuator (not shown), such as the actuator 144, that is mounted in a stationary position relative to the frame or housing of the machine and operatively connected to the shift drum 174 to cause the shift drum 174 to rotate between prescribed angular positions corresponding to the available locking modes of the MMCM 170. The actuator may be directly coupled to the shift drum 174, such as to the outer surface 188, or indirectly coupled thereto by an intermediate linkage, gears or other mechanism that can convert the rotation of the actuator into rotation of the shift drum 174.

The operation of the MMCM 170 to shift between the available locking modes is generally similar to the process described above. The actuator is actuated to rotate the shift drum 174, and the engagement between the camming groove 176 and the cam follower 184 causes the shift ring 172 and the cam ring 80 to translate parallel to the clutch rotational axis 56 between the locking mode positions. The MMCM 170 is illustrated in a two-way unlocked mode similar to that illustrated in FIG. 14 and described in the accompanying text. FIG. 16 more clearly illustrates the interaction between the detent members 100 and the detent recesses 128 of the cams 64. The rightmost detent recesses 128 have received the detent members 100 therein to align the cams 64 in the two-way locked mode position. Similarly, the leftmost detent recesses 128 will receive the detent members 100 as the cams 64 move to the right as shown toward the two-way unlocked mode position and snap the cams 64 and cam ring 80 into the proper position so that the cam ring 80 is not in contact with the annular groove 182 of the shift ring 172.

In the preceding embodiments, the cams 64 are configured to provide two locking modes in the MMCMs 50, 170. In alternative embodiments, the MMCMs 50, 170 may be configured to provide up to four locking modes by varying the configurations from the cams 64 and their camming surfaces 126 illustrated and described above. For example, FIG. 17 illustrates an embodiment of a cam 200 configured to provide four locking modes in the MMCMs 50, 170. The following discussion uses the convention of FIG. 4 wherein the pawls 60 control relative rotation of the inner race 54 relative to the notch ring 52 in the clockwise direction, and the pawls 62 control relative rotation of the inner race 54 relative to the notch ring 52 in the counterclockwise direction. The cam 200 may include a camming surface 202 having a first camming surface portion 204 that will interact with the camming end 118 of the corresponding pawl 60, and a second camming surface portion 206 that will interact with the camming end 118 of the corresponding pawl 62. The cam 200 may further include four detent recesses (not shown) that will receive the detent member 100 to align the cam 200 in the corresponding locking mode positions.

In a two-way locked mode, the cam 200 may be positioned so that the camming ends 118 of both pawls 60, 62 are disposed beyond the camming surface 202, and the pawls 60, 62 are rotated to their engaged or locked positions by the pawl springs 66 to lock the inner race 54 to the notch ring 52 for rotation in both directions. In a counterclockwise locking area 208 of the camming surface 202 for a one-way counterclockwise locked mode, the first camming surface portion 204 engages the camming end 118 of the pawl 60 to rotate the pawl 60 to the unlocked position that will allow the inner race 54 to rotate in the clockwise direction. The second camming surface portion 206 does not extend into the counterclockwise locking area 208, so the pawl 62 remains in the locked position and the inner race 54 cannot rotate in the counterclockwise direction relative to the notch ring 52. In a two-way unlocking area 210 of the camming surface 202 for a two-way unlocked mode, both camming surface portions 204, 206 engage the corresponding camming ends 118 of the pawl 60, 62 to rotate the pawls 60, 62 to the unlocked positions that will allow the inner race 54 to rotate in either direction relative to the notch ring 52. Finally, in a clockwise locking area 212 of the camming surface 202 for a one-way clockwise locked mode, the second camming surface portion 206 engages the camming end 118 of the pawl 62 to rotate the pawl 62 to the unlocked position that will allow the inner race 54 to rotate in the counterclockwise direction. The first camming surface portion 204 does not extend into the clockwise locking area 212, so the pawl 60 remains in the locked position and the inner race 54 cannot rotate in the clockwise direction relative to the notch ring 52.

The control mechanism for controlling the operation of MMCMs 50, 170 may be configured to cause the cams 200 to be moved to the required position for each of the available locking modes. The control mechanism transmits actuation signals to the actuators 144 to rotate the shift drums 142, 174 to the discrete angular positions necessary to cause the shift rings 140, 172 to position the cams 200 for the camming surface 202 to engage the pawls 60, 62 according to the commanded locking mode. Of course, the locations of the positions and the number of positions for the cams 64, 200 will vary on based on factors such as the number of locking modes provided by the MMCMs 50, 170, the shape of the camming surfaces 126, 202 to achieve a particular sequence of transitions between the available locking modes, and the like.

Even though specific embodiments of the MMCMs 50, 170 are illustrated and described herein, those skilled in the art will understand that alternative configurations of rotational multimode clutch modules are possible that provide operational modes or positions as alternatives or in addition to two-way locked and two-way unlocked modes (FIGS. 13 and 14), and the one-way locked, one-way unlocked mode using the cam 200 of FIG. 17).

Figure 18:
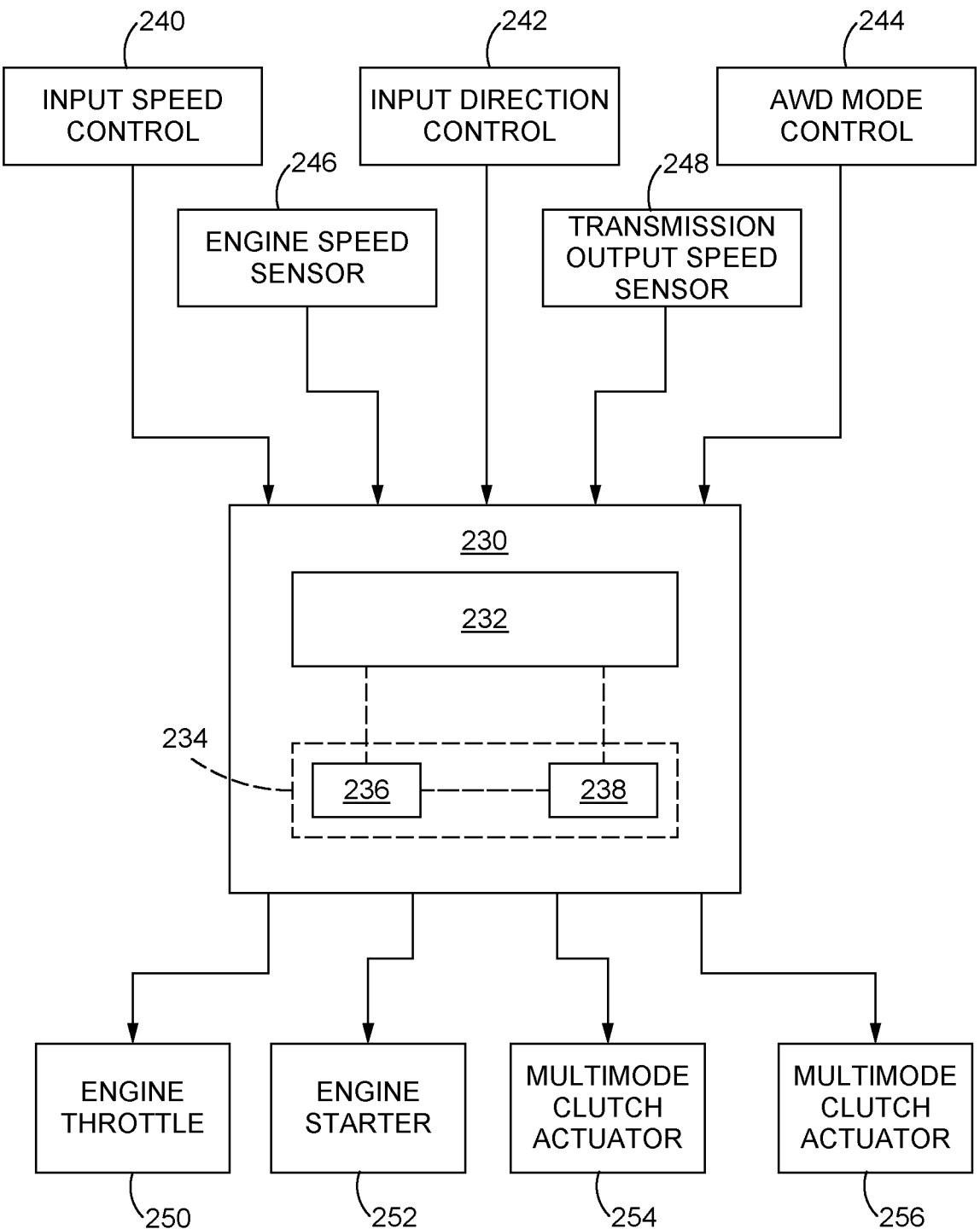
FIG. 18 is a schematic illustration of an exemplary electronic control unit and control components that may be implemented in the AWD vehicles of FIGS. 1 and 2.

FIG. 18 illustrates one exemplary configuration of a controller 230 that may be implemented in the AWD vehicles 10, 42 to control the operations of the power source 32 and the transmission 34 to provide power to drive the AWD vehicles 10, 42, and to the MMCMs 50, 170 for selectively entering the two-way lock mode of FIG. 13, the two-way unlock mode of FIG. 14 and the one-way lock, one-way unlock mode using the cam 200 of FIG. 17 as necessary based on the operating conditions for the AWD vehicles 10, 42. The controller 230 may include a microprocessor 232 for executing specified programs that control and monitor various functions associated with the AWD vehicles 10, 42, including functions that are outside the scope of the present disclosure. The microprocessor 232 includes a memory 234, such as read only memory (ROM) 236, for storing a program or programs, and a random access memory (RAM) 238 which serves as a working memory area for use in executing the program(s) stored in the memory 234. Although the microprocessor 232 is shown, it is also possible and contemplated to use other electronic components such as a microcontroller, an ASIC (application specific integrated circuit) chip, or any other integrated circuit device.

The controller 230 electrically connects to the control elements of the AWD vehicles 10, 42, as well as various input devices for commanding the operation of the AWD vehicles 10, 42 and monitoring their performance. As a result, the controller 230 may be electrically connected to input devices detecting operator input and providing control signals to the controller 230 that may include an input speed control 240, such as a gas pedal or accelerator, that is manipulated by the operator to regulate the speed of the AWD vehicles 10, 42, an input direction control 242, such as a gear shift or selection lever, that indicates a direction and/or a gear desired by the operator, and an AWD mode control that may allow the operator to manually select between options such as two-wheel drive, full time all-wheel drive and automatic all-wheel drive modes. The controller 230 may also be connected to sensing devices providing control signals with values indicating real-time operating conditions of the AWD vehicles 10, 42, such as an engine speed sensor 246 that measures an output speed of the power source 32, such as a rotary speed sensor measuring the rotational speed of the power source output shaft, and a transmission output speed sensor 248 that measures the rotational speed output by the transmission 34 or the transfer case 36, such as a rotary speed sensor measuring the rotational speed of the transmission output shaft 35 (FIG. 1). The controller 230 may also be electrically connected to output devices to which control signals are transmitted and from which control signals may be received by the controller 230, such as, for example, an engine throttle 250 that may control the speed of the power source 32, an engine starter 252 that may be configured to start up and shut down the power source 32 of the AWD vehicles 10, 42, and one or more multimode clutch actuators 254, 256 that may be part of the actuation mechanisms that move one or more MMCMs 50, 170 that may be implemented between various operating modes.

An operator of the AWD vehicles 10, 42 may manipulate the input speed control 240 to generate and transmit control signals to the controller 230 with commands indicating a desired increase or decrease in the speed of the AWD vehicles 10, 42, and the speed sensors 246, 248 generate and transmit control signals indicating the current speed of the power source 32 and of the transmission output shaft 35 (FIG. 1). The controller 230 may then determine any necessary changes for the operational states of the power source 32 and the transmission 34 and transmit appropriate control signals to the engine throttle 250 and the transmission 34 to change the engine speed and, correspondingly, the speed of the AWD vehicles 10, 42, as commanded by the operator. Those skilled in the art will understand that the input devices, output devices and operations of the controller 230 described herein are exemplary only, and that additional and alternative devices may be implemented in AWD vehicles 10, 42 in accordance with the present disclosure to monitor the operations of the AWD vehicles 10, 42 and inputs provided by operators of the AWD vehicles 10, 42, and to control the power source 32, the MMCM(s) 50, 170 and other systems of the AWD vehicles 10, 42 to operate in a desired manner.

The AWD mode control 244 and/or the controller 230 may control the switching of the MMCMs 50, 170 between the available drive modes. The AWD mode control 244 may allow an operator to manually control the mode of the MMCM 50, 170. When the AWD mode control 244 is in an all-wheel drive mode position, the controller 230 may transmit clutch mode control signals to the multimode clutch actuators 254, 256 to move the cam ring 80 to the two-way locked position of FIG. 13 for all-wheel drive in both directions or the one-way locked/one-way unlocked position with the cam 200 of FIG. 17 for all-wheel drive in one direction. When the AWD mode control 244 is in a two-wheel drive mode position, the controller 230 may transmit clutch mode control signals to the multimode clutch actuators 254, 256 to move the cam ring 80 to the two-way unlocked position of FIG. 14 for two-wheel drive using either the front wheels 12, 14 or the rear wheels 22, 24.

The controller 230 of the AWD vehicles 10, 42 may also or alternatively be configured to automatically shift into and out of all-wheel drive mode in real time based on the operating conditions of the AWD vehicles 10, 42. The automatic AWD mode may be active at all times, or may be commanded via an additional position of the AWD mode control 244. When in the automatic AWD mode, the controller 230 may determine when the conditions do not require all-wheel drive, such as when control signals from the engine speed sensor 246, the transmission output speed sensor 248 or other sensors indicate that the AWD vehicle 10, 42 is at a cruising speed. In response, the controller 230 may transmit clutch mode control signals to the multimode clutch actuators 254, 256 to move the cam ring 80 to the two-way unlocked position of FIG. 14. When the controller 230 determines when that the conditions require all-wheel drive, such as when one or more of the wheels 12, 14, 22, 24 slip or in other conditions typically used in previous automatic all-wheel drive vehicles where torque is required for all four wheels 12, 14, 22, 24, the controller 230 may respond by transmitting clutch mode control signals to the multimode clutch actuators 254, 256 to move the cam ring 80 to the two-way locked position of FIG. 13 or the one-way locked/one-way unlocked position with the cam 200 of FIG. 17 so that all four wheels 12, 14, 22, 24 are driven in the forward direction.

Figure 19:
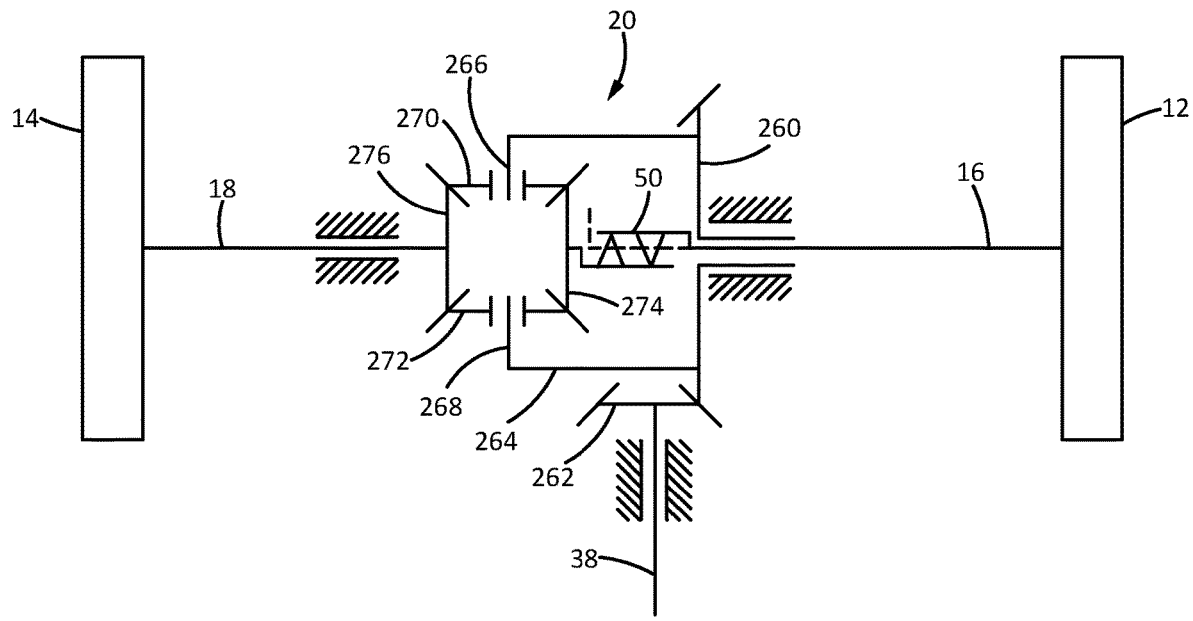
FIG. 19 is a schematic illustration of a front differential of the AWD vehicle of FIG. 1 having the MMCM of FIG. 3 or FIG. 15, for example, installed therein to perform a center axle disconnect of the set of front wheels.

The MMCMs 50, 170 as disclosed herein may be implemented at various locations throughout the powertrains of the AWD vehicles 10, 42 to provide selective disengagement of either the front wheels 12, 14 or the rear wheels 22, 24 to shift from all-wheel drive to two-wheel drive when desirable. FIG. 19 illustrates one example where the MMCM 50 may be implemented within the front differential 20 of the AWD vehicle 10 to provide selective disengagement of the front wheels 12, 14. The MMCM 50 is illustrated schematically in this and the following examples, but those skilled in the art will understand that the MMCM 170 or other rotating MMCMs may be implemented in a similar manner in the AWD vehicles 10, 42. The front differential 20 may be of a type known in the art, and may include a ring gear 260 that is rotatable about a rotational axis of the front half shafts 16, 18 and meshes with and is driven by a pinion gear 262 connected to an end of the front wheel drive shaft 38. The ring gear 260 may be mounted to a differential case 264 that rotates with the ring gear 260 and has inwardly extending pins 266, 268 serving as rotational shafts for a pair of spider gears 270, 272, respectively. A pair of side gears 274, 276 are mounted for rotation with the front half shafts 16, 18, respectively, and mesh with the spider gears 270, 272 so that input rotation of the front wheel drive shaft 38 will cause the front wheels 12, 14 to turn and propel the AWD vehicle 10 in the manner known in the art for differential gear sets.

In the illustrated embodiment, the MMCM 50 may be interposed within the front differential 20 between the front half shaft 16 and the corresponding side gear 274 to provide selective disengagement of power to the front wheels 12, 14. The front half shaft 16 may be connected to the inner race 54 and the side gear 274 may be connected to the notch ring 52, or vice versa. With the MMCM 50, the front half shaft 16 and the side gear 274 may be locked for rotation together when the MMCM 50 is in the position shown in FIG. 13, may be free to rotate independently when the MMCM 50 is in the two-way unlocked position of FIG. 14, and may rotate together in one direction and independently in the opposite direction when the MMCM 50 utilizes the cam 200 of FIG. 17. When the front half shaft 16 and the side gear 274 are unlocked, torque from the power source 32 cannot be transmitted to either front wheel 12, 14 by the front differential 20, and the AWD vehicle 10 will be in a two-wheel drive mode with all torque transmitted to the rear wheels 22, 24.

The one-way locked/one-way unlocked mode of the MMCM 50 may be particularly useful in low-speed driving situations where the front wheels 12, 14 may travel farther in a turn (i.e, faster rotation of the front half shafts 16, 18) than dictated by the rotation of the front wheel drive shaft 38. In this situation, the MMCM 50 may allow the front half shafts 16, 18 to overrun the speed of the front wheel drive shaft 38 to prevent the condition known as "crop hop" where either the front wheels 12, 14 or the rear wheels 22, 24 slip because they are rotating at different speeds. Depending on the implementation, the controller 230 by default may set the cam 200 of the MMCM 50 to the position in the all-wheel drive mode to handle the overrun condition at any time. Alternatively, the controller 230 may be configured to determine based on current operating information from sensors such as the sensors 246, 248 that the AWD vehicle 10 is traveling at a low speed where the overrun condition may occur, and transmit clutch mode control signals to cause the multimode clutch actuator 254 to place the MMCM 50 in the one-way locked/one-way unlocked position during those conditions.

The center axle disconnect strategy of FIG. 19 may be implemented in alternative forms. For example, the MMCM 50 may be installed between the other front half shaft 18 and the side gear 276. The MMCM 50 could also be installed between the front wheel drive shaft 38 and the pinion gear 262 to selectively cut off torque to the front differential 20 entirely. In the AWD vehicle 42, the MMCM 50 may be installed in the rear differential 30 at similar locations to selectively disengaged the rear wheels 22, 24 from the powertrain. The MMCM 50 may also be installed in a similar manner in the PTU 44 in the AWD vehicle 42. The MMCM 50 could also be installed between the rear wheel drive shaft 40 and a pinion gear (not shown) of the PTU 44 that is operatively coupled to the front differential 20 to selectively cut off torque transferred from the front differential 20 to the rear wheel drive shaft 40 by the PTU 44.

Figure 20:
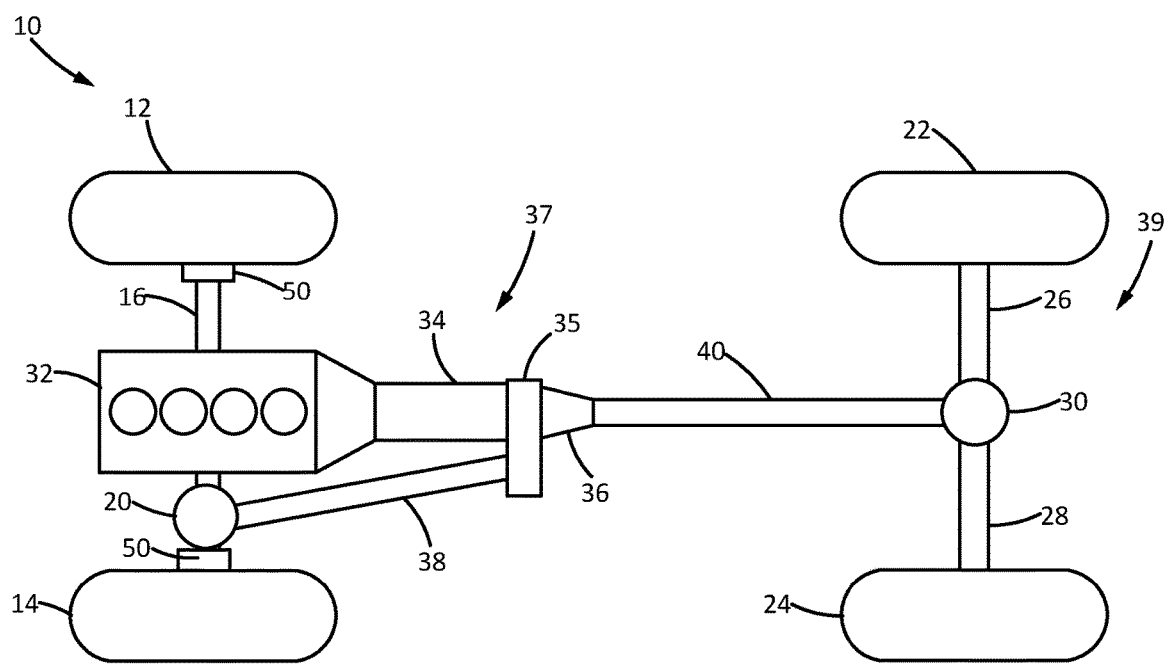
FIG. 20 is a schematic illustration of the AWD vehicle of FIG. 1 having the MMCM of FIG. 3 or FIG. 15, for example, installed on each of the front half shafts.

In the embodiments discussed in relation to FIG. 19, hydraulic losses due to oil churning in the front differential 20 are reduced but not completely eliminated as the internal components continue to rotate even though no torque is being transferred. FIG. 20 illustrates an alternative embodiment wherein the MMCM 50 is installed at hubs (not shown) of each of the front wheels 12, 14 of the AWD vehicle 10. On one side, a first MMCM 50 may have the inner race 54 connected to the wheel hub of the front wheels 12 and the notch ring 52 connected to the end of the front half shafts 16, or vice versa. A second MMCM 50 is similarly installed between the wheel hub of the front wheel 14 and the front half shaft 18. The first and second MMCMs 50 may be operatively connected to the first and second multimode clutch actuators 254, 256, respectively. When the AWD mode control 244 is actuated or the controller 230 otherwise determines that the mode is to change from all-wheel drive to two-wheel drive or vice versa, the controller 230 may transmit clutch mode control signals to both multimode clutch actuators 254, 256 to move the cam rings 80 to the appropriate positions. In two-wheel drive mode with the connections between both front wheels 12, 14 and the front differential 20 broken, the front wheels 12, 14 and the front half shafts 16, 18 are not rotating the components of the front differential 20, thereby further reducing the hydraulic losses due to oil churning within the front differential 20. Of course, those skilled in the art will understand that a similar arrangement may be implemented in the AWD vehicle 42 by installing the MMCMs 50 between the rear wheels 22, 24 and the rear half shafts 26, 28.

Figure 21:
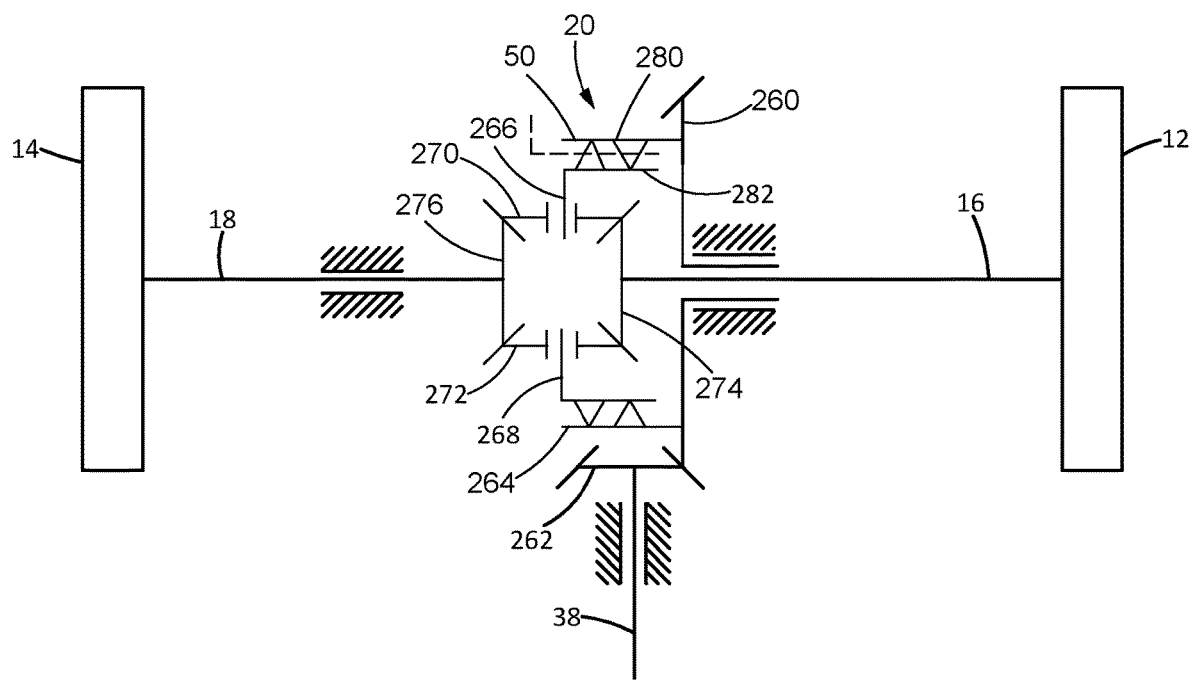
FIG. 21 is a schematic illustration of the front differential of the AWD vehicle of FIG. 1 having the MMCM of FIG. 3 or FIG. 15, for example, installed therein to perform an inter-axle disconnect of the set of front wheels.

FIG. 21 illustrates a further alternative embodiment where the MMCM 50 is implemented within the front differential 20 and an alternate location. In this embodiment, the differential case 264 may be separated into an outer differential case portion 280 that is connected to and rotates with the ring gear 260, and an inner differential case portion 282 that carries the pins 266, 268 and the spider gears 270, 272. The inner race 54 may be connected to one of the differential case portions 280, 282 and the notch ring 52 may be connected to the other differential case portion 280, 282. When the MMCM 50 is unlocked, the ring gear 260 and the outer differential case portion 280 can rotate independent of the inner differential case portion 282 so that torque from the powertrain is not transferred to the front wheels 12, 14. As with other embodiments, the MMCM 50 may be installed in the rear differential 30 in the AWD vehicle 42 to disengage the rear wheels 22, 24. Similar to the embodiment of FIG. 19, this inter-axle disconnect arrangement reduces the hydraulic losses within the differentials 20, 30 by reducing the rotation of the parts therein.

Figure 22:
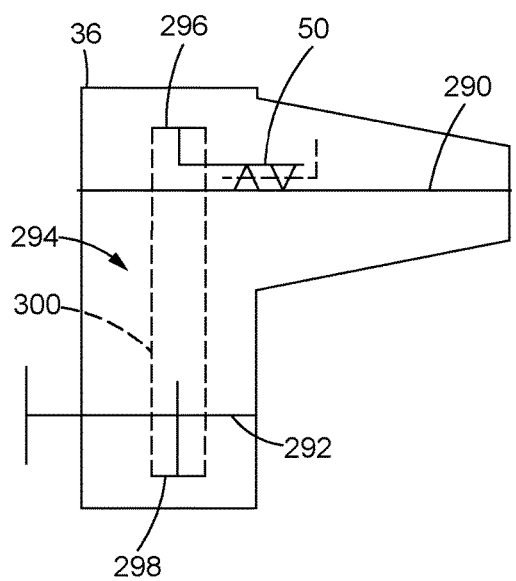
FIG. 22 is a schematic illustration of a transfer case of the AWD vehicle of FIG. 1 having the MMCM of FIG. 3 or FIG. 15, for example, installed therein to perform a transfer case disconnect of the set of front wheels.

In further alternative embodiments, one set of driven wheels can be selectively disengaged by breaking the connection of the corresponding drive shaft 38, 40 to the powertrain. In one implementation, the MMCM 50 may be installed between two portions of the front wheel drive shaft 38 in the AWD vehicle 10 or the rear wheel drive shaft 40 in the AWD vehicle 42, and selectively actuated to disengage the shaft portions from each other. In other embodiments, the MMCM 50 may be installed within the transfer case 36 to selectively disconnect the power transfer mechanism that divides the torque from the power source 32 between the wheel drive shaft 38, 40. FIG. 22 is a schematic illustration of an exemplary power transfer mechanism of the transfer case 36. The power transfer mechanism may include a first power transfer shaft 290 operatively connected at one end to the transmission output shaft 35 (FIG. 1) and at the opposite end to the one of the wheel drive shaft 38, 40 that will receive power in the two-wheel drive mode. A second power transfer shaft 292 may be connected to the other of the wheel drive shafts 38, 40 that will be disengaged from the powertrain.

The power transfer shafts 290, 292 may be connected by a drive mechanism 294 causing the second power transfer shaft 292 to rotate in response to rotation of the first power transfer shaft 290. The drive mechanism 294 in the illustrated embodiment may be a chain drive having a first sprocket 296 mounted on and rotatable with the first power transfer shaft 290, a second sprocket 298 mounted on and rotatable with the second power transfer shaft 292, and a chain 300 around the sprockets 296, 298 and engaged by teeth of the sprockets 296, 298 so that the first power transfer shaft 290 drives the second power transfer shaft 292 when rotated by the transmission output shaft 35 (FIG. 1). In alternative embodiments, the chain drive may be replaced by meshing gears, a drive belt and pulleys, or other appropriate drive mechanisms 294 for concurrent rotation of the power transfer shafts 290, 292.

In the transfer case 36 as described, disengagement of the drive mechanism 294 and, consequently, the second power transfer shaft 292 may be achieved by installing the MMCM 50 between the first power transfer shaft 290 and the first sprocket 296 as shown. The inner race 54 of the MMCM 50 may be connected to the first power transfer shaft 290 and the notch ring 52 may be connected to the first sprocket 296, or vice versa. In this arrangement, the first power transfer shaft 290 and the first sprocket 296 may be locked for rotation together and all-wheel drive in both directions (FIG.

13), may be unlocked to disable all-wheel drive in both directions (FIG. 14), or one-way locked/one-way unlocked (cam 200 of FIG. 17). When the MMCM 50 is unlocked, the first power transfer shaft 290 will rotate independent of the first sprocket 296 so that torque is not transferred to the second power transfer shaft 292 by the drive mechanism 294. In an alternative embodiment, the MMCM 50 may be installed in a similar manner between the second power transfer shaft 292 and the second sprocket 298.

Figure 23:
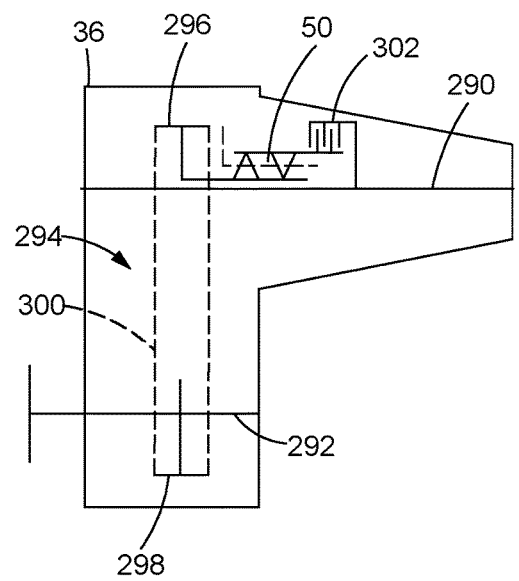
FIG. 23 is a schematic illustration of the transfer case of the AWD vehicle of FIG. 1 having the MMCM of FIG. 3 or FIG. 15, for example, and a friction clutch installed therein to perform a transfer case disconnect of the set of front wheels.

In some all-wheel drive applications, it may be desirable to allow for some slippage between the power transfer shafts 290, 292 within the transfer case 36 under certain torque distribution conditions. FIG. 23 illustrates an embodiment of the transfer case 36 where a friction clutch 302 may be provided to connect the first power transfer shaft 290 to the first sprocket 296. The friction clutch 302 may allow a desired amount of slippage between the first power transfer shaft 290 and the first sprocket 296 under high torque conditions. In this embodiment, the MMCM 50 may be installed between the first sprocket 296 and the friction clutch 302 for selective disengagement to alternate between all-wheel drive and two-wheel drive. In a further alternative embodiment, the MMCM 50 may be installed between the first power transfer shaft 290 and the friction clutch 302, with the first sprocket 296 and the friction clutch 302 maintaining constant contact and simultaneous rotation with the exception of the anticipated slippage within the friction clutch 302.

Figure 24:
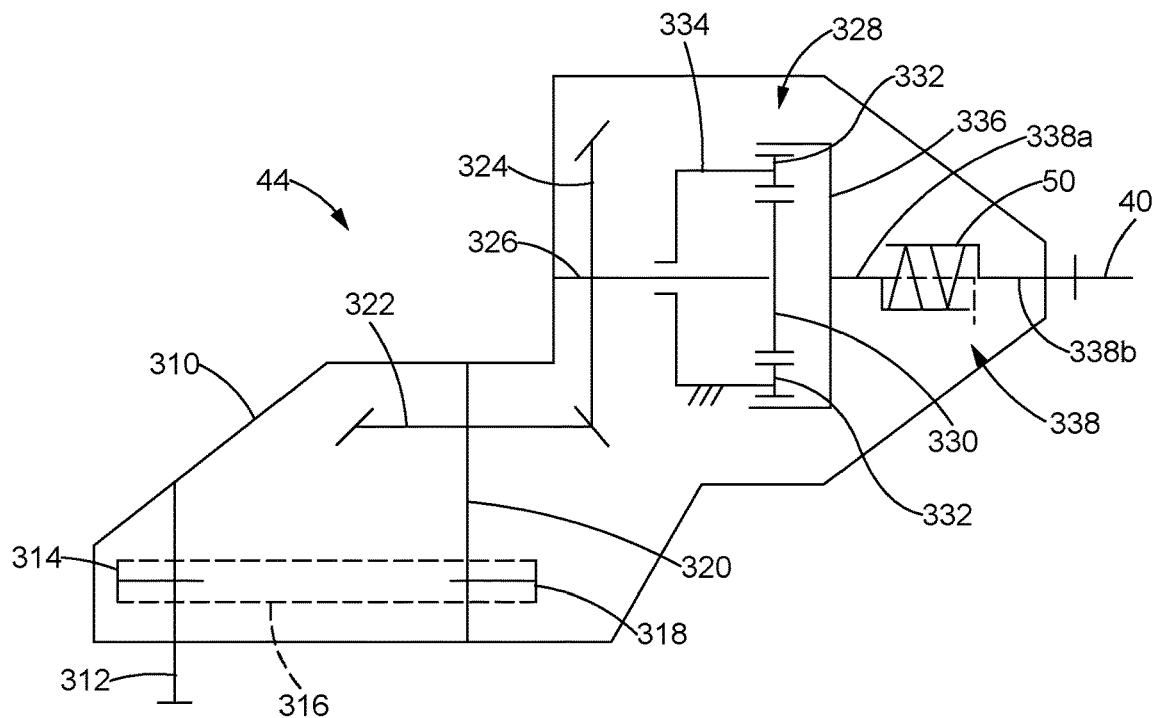
FIG. 24 is a schematic illustration of the power transfer unit of the AWD vehicle of FIG. 2 having the MMCM of FIG. 3 or FIG. 15, for example, installed therein to perform a power transfer unit disconnect of the set of rear wheels.

FIG. 24 schematically illustrates a further alternative embodiment where the MMCM 50 is implemented within the power transfer unit 44 of the AWD vehicle 42 to selectively engage and disengage the rear wheel drive shaft 40 to switch between all-wheel drive and two-wheel drive using the front wheels 12, 14. The illustrated exemplary power transfer unit 44 may include a PTU housing 310 carrying a power transfer unit input shaft 312 that is operatively connected at the transmission output shaft 35 (FIG. 1) and functions as a power input shaft for the power transfer unit 44. A first power transfer gear 314 is mounted on the power transfer unit input shaft 312 for rotation therewith, and is operatively connected by a drive mechanism 316 to a second power transfer gear 318 mounted for rotation with a first power transfer shaft 320. The drive mechanism 316 in the illustrated embodiment may be a series of gear wheels or a gear train transferring the rotation of the power transfer unit input shaft 312 to the first power transfer shaft 320. In alternative embodiments, the drive mechanism 316 may be a belt, chain or similar means for transferring the rotation of the first power transfer gear 314 to the second power transfer gear 318.

The first power transfer shaft 320 may be rotatably mounted to the PTU housing 310 and may have a first bevel gear 322 mounter thereon for rotation therewith. The first bevel gear 322 may be engaged by a second bevel gear 324 mounted on a second power transfer shaft 326 extending from the PTU housing 310 perpendicular to the first power transfer shaft 320. The second power transfer shaft 326 maybe operatively connected to the rear wheel drive shaft 40 by a planetary gear set 328 and the MMCM 50. The planetary gear set 328 includes a sun gear 330 mounted on the second power transfer shaft 326 and rotating with the second power transfer shaft 326 as the first bevel gear 322 drives the second bevel gear 324. The sun gear 330 meshes with one or more planet gears 332 mounted on a planet carrier 334. The planet carrier 334 in the present embodiment is anchored to the PTU housing 310 or other fixed structure to prevent rotation of the planet carrier 334 relative to the PTU housing 310. A ring gear 336 meshes with the planet gears 332 and rotates when the sun gear 330 is rotated by the second power transfer shaft 326. A power transfer unit output shaft 338 is connected to the ring gear 336 and extends from the power transfer unit 44 for connection of the rear wheel drive shaft 40.

The input rotation of the power transfer unit input shaft 312 is selectively applied to the rear wheel drive shaft 40 by coupling the MMCM 50 between the ring gear 336 and the power transfer unit output shaft 338. The notch ring 52 may be connected to the ring gear 336 or a first shaft portion 338a extending therefrom and the inner race 54 may be connected to the power transfer unit output shaft 338 of a second shaft portion 338b, or vice versa. In this arrangement, the ring gear 336 and the power transfer unit output shaft 338 may be locked for rotation together and all-wheel drive in both directions (FIG. 13), may be unlocked to disable all-wheel drive in both directions (FIG. 14), or one-way locked/one-way unlocked (cam 200 of FIG. 17). When the MMCM 50 is unlocked, the ring gear 336 will rotate independent of the power transfer unit output shaft 338 so that torque is not transferred to the rear wheel drive shaft 40 and the rear wheels 22, 24 by the power transfer unit 44. When the MMCM 50 is locked, the ring gear 336 and the rear wheel drive shaft 40 rotate together to transfer torque from the power source 32 and the transmission 34 to the rear wheels 22, 24, and with the planetary gear set 328 providing a speed reduction from the transmission output shaft 35 to the rear wheel drive shaft 40.

Figure 25:
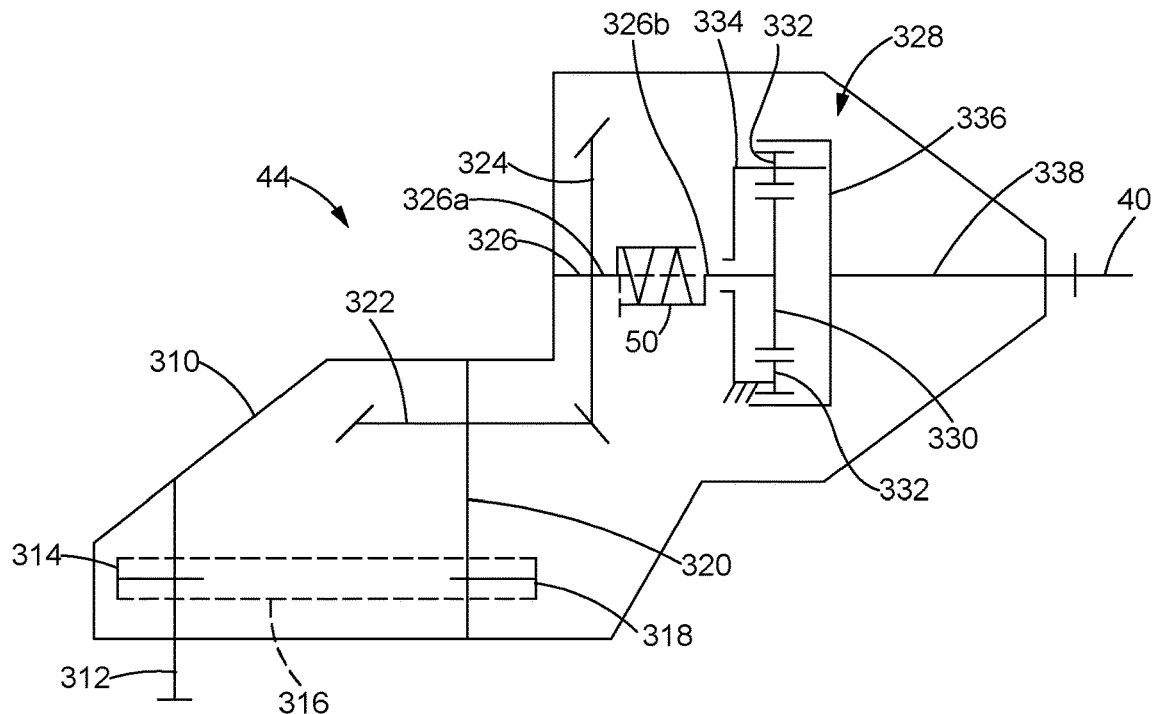
FIG. 25 is a schematic illustration of the power transfer unit of the AWD vehicle of FIG. 2 having the MMCM of FIG. 3 or FIG. 15, for example, installed therein in an alternative embodiment to perform a power transfer unit disconnect of the set of rear wheels.

In the alternative embodiment shown in FIG. 25, the MMCM 50 is installed on the second power transfer shaft 326 between the second bevel gear 324 and the sun gear 330. The notch ring 52 may be connected to the sun gear 330 or a shaft extending therefrom and the inner race 54 may be connected to the second bevel gear 324, or vice versa. The MMCM 50 may be locked to provide input rotation to the planetary gear set 328 that is transferred to the rear wheel drive shaft 40, or unlocked to cut off power transmission to the planetary gear set 328. Those skilled in the art will understand that the MMCM 50 may be installed at other locations within the power transfer unit 44 to lock and unlock adjacent components for rotation together or relative rotation there between, respectively, and alternate between all-wheel drive and two-wheel drive.

INDUSTRIAL APPLICABILITY

The MMCMs 50, 170 may serve as replacements for dog clutches and friction clutches in locations within the powertrain that currently utilize such devices. The MMCMs 50, 170 as described herein may also occupy new locations within the powertrain to take advantage of the unique engagement characteristics and low drag torque of the MMCMs 50, 170. As illustrated in FIGS. 13 and 14, the cam ring 80 requires a relatively low amount of actuator travel and actuator force to move the cam ring 80 between the limit positions shown in the drawings. The travel distance and force may be significantly less than the distance in force required to move the replaced dog clutches and friction clutches between their engaged and disengaged modes. Such reductions in travel distance and force facilitate corresponding reductions in the size and mass of the multimode clutch actuators 254, 256 relative to the actuators of the replaced clutches, which can improve the efficiency of the AWD vehicles 10, 42, and reduce the cost of the clutching systems. Moreover, further efficiency improvements may be realized as a result of the low drag torque present when the MMCMs 50, 170 are unlocked and the inner race 54 rotates relative to the notch ring 52. In addition, the overall performance of the AWD vehicles 10, 42 may be improved by providing a single clutching mechanism with the capability of providing connections between components of the powertrain that can provide each of the distinct clutch modes available in the MMCMs 50, 170.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An all-wheel drive (AWD) vehicle, comprising:
   a pair of front wheels;
   a pair of rear wheels;
   a power source;
   a transmission operatively connected to the power source and receiving power output by the power source, the transmission having a transmission output shaft configured to supply an input rotation;
   a front wheel driveline operatively connected between a power source output shaft and the front wheels to transfer power from the power source to rotate the front wheels;
   a rear wheel drive shaft operatively connected between the transmission output shaft and the rear wheels to transfer power from the power source to rotate the rear wheels;
   a multimode clutch module having a first race and a second race in which the first race is configured to receive the input rotation from the transmission output shaft and the rear wheel drive shaft is configured to receive the input rotation from the second race, wherein the multimode clutch module has a first mode wherein the first and second race are selectively locked to rotate together the multimode clutch module transmits torque from the power source to the rear wheels when the transmission output shaft rotates, and a second mode wherein the first and second race are selectively unlocked to rotate independently the multimode clutch module does not transmit torque from the power source to the rear wheels when the transmission output shaft rotates and the rear wheel drive shaft rotates independent of the input rotation; and
   a cam ring having a plurality of cams fixedly extending axially outward from a surface of the cam ring and operatively coupled to the second race such that the cam ring rotates with the second race, wherein the cam ring is axially moveable between a first cam ring position where the cams engage a plurality of pawls and cause the first race and the second race to rotate together in the first mode of the multimode clutch module, and a second cam ring position where the cams allow the first race and the second race to rotate relative to each other in the second mode of the multimode clutch module.

2. The AWD vehicle according to claim 1, comprising a power transfer unit operatively connected between the transmission output shaft and the rear wheel drive shaft, wherein the multimode clutch module is a component within the power transfer unit.

3. The AWD vehicle according to claim 2, wherein the multimode clutch module connects the power transfer unit to the rear wheel drive shaft.

4. The AWD vehicle according to claim 3, wherein the multimode clutch module is connected between a ring gear and the rear wheel drive shaft so that the ring gear and the rear wheel drive shaft rotate together to transmit torque from the transmission output shaft to the rear wheels when the multimode clutch module is in the first mode, and the ring gear and the rear wheel drive shaft rotate relative to each other and torque is not transmitted from the transmission output shaft to the rear wheels when the multimode clutch module is in the second mode.

5. The AWD vehicle according to claim 1, comprising:
   a multimode clutch actuator operatively connected to the multimode clutch module and being configured to selectively place the multimode clutch module in the first mode and the second mode; and
   a controller operatively connected to the multimode clutch actuator, the controller being configured to transmit clutch mode control signals to the multimode clutch actuator to cause the multimode clutch actuator to place the multimode clutch module in the first mode and the second mode.

6. The AWD vehicle according to claim 5, comprising a plurality of sensors operatively connected to the controller, wherein the plurality of sensors sense a plurality of operating parameters of the AWD vehicle and transmit sensor signals to the controller containing values of the plurality of operating parameters, wherein the controller is configured to transmit the clutch mode control signals to the multimode clutch actuator to place the multimode clutch module in the first mode and the second mode.

7. The AWD vehicle according to claim 5, wherein the multimode clutch module comprises:
   the first race configured to be coupled to a first rotating component of the AWD vehicle between the transmission output shaft and the rear wheel drive shaft for rotation therewith;
   the second race configured to be coupled to a second rotating component of the AWD vehicle between the transmission output shaft and the rear wheel drive shaft for rotation therewith.

8. A power transfer unit for an all-wheel drive (AWD) vehicle having a power source, a transmission operatively connected to the power source and having a transmission output shaft, a front wheel driveline operatively connected between the transmission output shaft and a pair of front wheels to transfer power from the power source to the front wheels, and a rear wheel drive shaft operatively connected to a pair of rear wheels, the power transfer unit comprising:
   a power transfer unit input shaft operatively connected to the transmission output shaft;

a power transfer unit output shaft operatively connected to the rear wheel drive shaft;

a plurality of gears operatively connecting the power transfer unit input shaft to the power transfer unit output shaft so that rotation of the power transfer unit input shaft causes rotation of the power transfer unit output shaft with a reduction in rotational speed from a rotational speed of the rear wheel drive shaft;

a multimode clutch module having a first race and a second race allowing the power transfer unit to selectively transmit power from the power source to the rear wheels, wherein the first race is configured to receive an input rotation from the power transfer unit input shaft and the power transfer unit output shaft is configured to receive the input rotation from the second race, the multimode clutch module has a first mode wherein the first and second races are selectively locked to rotate together the multimode clutch module transmits torque from the power transfer unit input shaft to the power transfer unit output shaft through the plurality of gears, and a second mode wherein the first and second race are selectively unlocked to rotate independently the multimode clutch module does not transmit torque from the power transfer unit input shaft to the power transfer unit output shaft through the plurality of gears, and the power transfer unit output shaft rotates independent of the input rotation; and a cam ring having a plurality of cams fixedly extending therefrom and axially moveable between a first cam ring position where the cams engage a plurality of pawls and cause the first race and the second race to rotate together in the first mode of the multimode clutch module, and a second cam ring position where the cams allow the first race and the second race to rotate relative to each other in the second mode of the multimode clutch module.

9. The power transfer unit according to claim 8, wherein the multimode clutch module operatively connects a first shaft portion of the power transfer unit output shaft to a second shaft portion of the power transfer unit output shaft, and wherein the multimode clutch module causes the first shaft portion and the second shaft portion to rotate together when the multimode clutch module is in the first mode, the multimode clutch module allows the first shaft portion and the second shaft portion to rotate independent of each other when the multimode clutch module is in the second mode.

10. The power transfer unit according to claim 8, wherein the plurality of gears includes a planetary gear set having a sun gear operatively coupled to and driven by the power transfer unit input shaft, at least one planet gear meshing with the sun gear and mounted on a planet carrier that is held stationary relative to a housing of the power transfer unit, and a ring gear that meshes with the at least one planet gear and is operatively connected to the power transfer unit output shaft.

11. The power transfer unit according to claim 10, wherein the multimode clutch module comprises:

the first race connected to the ring gear; and the second race connected to the power transfer unit output shaft, wherein the ring gear and the power transfer unit output shaft rotate together to transmit torque from the power transfer unit input shaft to the power transfer unit output shaft when the multimode clutch module is in the first mode, and wherein the ring gear and the power transfer unit output shaft rotate relative to each other and torque is not transmitted from the power transfer unit input shaft to the power transfer unit output shaft when the multimode clutch module is in the second mode.

12. The power transfer unit according to claim 10, wherein the multimode clutch module comprises:

the first race connected to the sun gear; and the second race connected to a power transfer shaft of the power transfer unit, wherein the sun gear and the power transfer shaft rotate together to transmit torque from the power transfer unit input shaft to the power transfer unit output shaft when the multimode clutch module is in the first mode, and wherein the sun gear and the power transfer shaft rotate relative to each other and torque is not transmitted from the power transfer unit input shaft to the power transfer unit output shaft when the multimode clutch module is in the second mode.

13. The power transfer unit according to claim 8, wherein the AWD vehicle includes a controller, the power transfer unit comprising a multimode clutch actuator operatively connected to the multimode clutch module and to the controller and configured to selectively place the multimode clutch module in the first mode and the second mode, wherein the multimode clutch actuator receives clutch mode control signals from the controller and causes the multimode clutch module to move between the first mode and the second mode in response to the clutch mode control signals.

14. An all-wheel drive (AWD) vehicle comprising:

a pair of front wheels;

a pair of rear wheels;

a power source;

a transmission operatively connected to the power source and receiving power output by the power source, the transmission having a transmission output shaft configured to supply an input rotation;

a front wheel driveline operatively connected between a power source output shaft and the front wheels to transfer power from the power source to rotate the front wheels;

a rear wheel drive shaft operatively connected between the transmission output shaft and the rear wheels to transfer power from the power source to rotate the rear wheels;

a multimode clutch module having a first race and a second race in which the first race is configured to receive the input rotation from the transmission output shaft and the rear wheel drive shaft is configured to receive the input rotation from the second race, wherein the multimode clutch module has a first mode wherein the first and second race are selectively locked to rotate together the multimode clutch module transmits torque from the power source to the rear wheels when the transmission output shaft rotates, and a second mode wherein the first and second race are selectively unlocked to rotate independently the multimode clutch module does not transmit torque from the power source to the rear wheels when the transmission output shaft rotates and the rear wheel drive shaft rotates independent of the input rotation;

a cam ring having a plurality of cams fixedly extending therefrom and axially moveable between a first cam ring position where the cams engage a plurality of pawls and cause the first race and the second race to rotate together in the first mode of the multimode clutch module, and a second cam ring position where the cams allow the first race and the second race to rotate relative to each other in the second mode of the multimode clutch module; and a power transfer unit operatively connected between the transmission output shaft and the rear wheel drive shaft, wherein the multimode clutch module is a component within the power transfer unit, wherein the power transfer unit includes a planetary gear set having a sun gear operatively coupled to and driven by the transmission output shaft, at least one planet gear meshing with the sun gear and mounted on a planet carrier that is held stationary relative to a housing of the power transfer unit, and a ring gear that meshes with the at least one planet gear and is operatively connected to the rear wheel drive shaft.

15. An all-wheel drive (AWD) vehicle, comprising:

a pair of front wheels;

a pair of rear wheels;

a power source;

a transmission operatively connected to the power source and receiving power output by the power source, the transmission having a transmission output shaft configured to supply an input rotation;

a front wheel driveline operatively connected between a power source output shaft and the front wheels to transfer power from the power source to rotate the front wheels;

a rear wheel drive shaft operatively connected between the transmission output shaft and the rear wheels to transfer power from the power source to rotate the rear wheels;

a multimode clutch module having a first race and a second race in which the first race is configured to receive the input rotation from the transmission output shaft and the rear wheel drive shaft is configured to receive the input rotation from the second race, wherein the multimode clutch module has a first mode wherein the first and second race are selectively locked to rotate together the multimode clutch module transmits torque from the power source to the rear wheels when the transmission output shaft rotates, and a second mode wherein the first and second race are selectively unlocked to rotate independently the multimode clutch module does not transmit torque from the power source to the rear wheels when the transmission output shaft rotates and the rear wheel drive shaft rotates independent of the input rotation; and a cam ring having a plurality of cams fixedly extending therefrom and axially moveable between a first cam ring position where the cams engage a plurality of pawls and cause the first race and the second race to rotate together in the first mode of the multimode clutch module, and a second cam ring position where the cams allow the first race and the second race to rotate relative to each other in the second mode of the multimode clutch module; and a power transfer unit operatively connected between the transmission output shaft and the rear wheel drive shaft, wherein the multimode clutch module is a component within the power transfer unit wherein the multimode clutch module connects the power transfer unit to the rear wheel drive shaft, and wherein the multimode clutch module is connected between the transmission output shaft and a sun gear so that the sun gear rotates in response to rotation of the transmission output shaft to transmit torque from the transmission output shaft to the rear wheels when the multimode clutch module is in the first mode, and the sun gear does not rotate in response to rotation of the transmission output shaft and torque is not transmitted from the transmission output shaft to the rear wheels when the multimode clutch module is in the second mode.

* * * * *